(12) United States Patent
Lindoff et al.

(10) Patent No.: US 8,989,087 B2
(45) Date of Patent: Mar. 24, 2015

(54) METHODS AND DEVICES FOR MANAGING RADIO ACCESS IN A COMMUNICATION SYSTEM

(75) Inventors: Bengt Lindoff, Bjärred (SE); Gunnar Mildh, Sollentuna (SE); Stefan Parkvall, Stockholm (SE); Mats Fredrik Sågfors, Kyrkslätt (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 531 days.

(21) Appl. No.: 13/018,779

(22) Filed: Feb. 1, 2011

(65) Prior Publication Data
US 2011/0305220 A1 Dec. 15, 2011

Related U.S. Application Data

(60) Provisional application No. 61/354,773, filed on Jun. 15, 2010.

(30) Foreign Application Priority Data

Nov. 18, 2010 (WO) ................. PCT/SE2010/051273

(51) Int. Cl.
*H04W 4/00* (2009.01)
*H04W 36/00* (2009.01)
(Continued)

(52) U.S. Cl.
CPC ............. *H04W 28/26* (2013.01); *H04W 92/02* (2013.01)
USPC ............................ 370/328; 370/331; 455/436

(58) Field of Classification Search
CPC ............... H04L 5/001; H04W 76/025; H04W 36/0022; H04W 92/02
See application file for complete search history.

(56) References Cited

U.S. PATENT DOCUMENTS

| 2004/0100922 A1 | 5/2004 | Yegin |
| 2006/0193295 A1 | 8/2006 | White et al. |

(Continued)

FOREIGN PATENT DOCUMENTS

WO    WO2010068155    *    7/2010

OTHER PUBLICATIONS

3GPP TSG-RAN WG2 #66, "Handover for Carrier Aggregation", Los Angeles, USA, Jun. 29, 2009 to Jul. 3, 2009; CATT, retrieved from Internet Aug. 23, 2011, URL: http://www.3gpp.org/ftp/tsg_ran/WG2_RL2/TSGR2_66bis/docs/R2-093772. zip; whole document; See especially section 2.1.

(Continued)

*Primary Examiner* — Melanie Jagannathan
(74) *Attorney, Agent, or Firm* — Coats & Bennett, PLLC

(57) ABSTRACT

A method for managing radio access comprises sending of a radio access technology (RAT) resource aggregation request from a first radio access network (RAN) to a second RAN concerning communication with a user equipment connected to a source RAN, and returning a response to the first RAN. The source RAN is the first or second RAN. The first and second RANs use different radio access technologies. Radio resources of a base station in a target RAN, the RAN to which the user equipment is not connected, are reserved. A report of the reserved radio resources is sent to the source RAN. A RAT resource aggregation command is transmitted to the user equipment. The RAT resource aggregation command comprises that a RAT resource aggregation shall be used and the reserved radio resources. The base stations have at least partly overlapping coverage areas.

22 Claims, 12 Drawing Sheets

(51) Int. Cl.
*H04W 28/26* (2009.01)
*H04W 92/02* (2009.01)

(56) References Cited

U.S. PATENT DOCUMENTS

| | | | |
|---|---|---|---|
| 2008/0242301 A1* | 10/2008 | Osterling et al. | 455/436 |
| 2009/0036131 A1* | 2/2009 | Diachina et al. | 455/436 |
| 2010/0062800 A1 | 3/2010 | Gupta et al. | |
| 2011/0134831 A1* | 6/2011 | Pirskanen | 370/328 |

OTHER PUBLICATIONS

3GPP TSG-RAN WG2 Meeting #69, R2-101985, Beijing, China, Apr. 12-16, 2010, URL: http://www3gpp.org/ftp/tsg_ran/WG2_RL2/TSGR2_69bis/Docs/R2-101985.zip; See sections 6.4, 7.5 and X.3.

3GPP TS 36.423 V9.2.0 (Mar. 2010), Technical Specification Group Radio Access Network; Evolved Universal Terrestrial Radio Access Network (E-UTRAN); X2 application protocol (X2AP) (Release 9), retrieved from the internet Aug. 23, 2011, URL; http://www.3gpp.org/ftp/Specs/archive/36_series/36.423,36423-920.zip; See sections 8.2.1.1 and 8.2.1.2.

3GPPTSG-RAN WG2 #66, "Control plane aspects of carrier aggregation", San Francisco, USA, May 4-8, 2009, Source: Ericsson, retrieved from the internet Aug. 23, 2011, URL: http://www.3gpp.org/ftp/tsg_ran/WG2_RL2/TSGR2_66/docs/R2-092958.zip; whole document; See especially section 2.2.

\* cited by examiner

METHODS AND DEVICES FOR MANAGING RADIO ACCESS IN A COMMUNICATION SYSTEM

RELATED APPLICATIONS

This application claims priority under 35 U.S.C. §119(e) to provisional patent application Ser. No. 61/354,773, filed Jun. 15, 2010, the entire contents of which are incorporated herein by reference. This application also claims priority under 35 U.S.C. §120 to international patent application PCT/SE2010/051273, filed Nov. 18, 2010, the entire contents of which are also incorporated herein by reference.

TECHNICAL FIELD

The present invention relates in general to methods and devices for managing radio access in a communication system and in particular to methods and devices for managing of secondary radio access connections for inter-radio access carrier aggregation.

BACKGROUND

Today, there are many radio and cellular access technologies and standards such as Global System for Mobile Communications (GSM)/General Packet Radio Service (GPRS), Wideband Code-Division Multiple Access (WCDMA)/High-Speed Packet Access (HSPA), Code-Division Multiple Access (CDMA)-based technologies, WiFi, Worldwide Interoperability for Microwave Access (WiMAX) and recently Long Term Evolution (LTE), to name a few. The technologies and standards have been developed during the last few decades, and it can be expected that the development will continue. Specifications are developed in organizations like 3rd-Generation Partnership Project (3GPP), 3rd-Generation Partnership Project 2 (3GPP2) and Institute of Electrical and Electronics Engineers (IEEE).

3GPP is responsible for the development and maintenance of GSM/GPRS, WCDMA/HSPA and LTE standards. This disclosure focuses primarily on the HSPA-evolution built on the WCDMA radio access, also called Universal Terrestrial Radio Access Network (UTRAN), and LTE, based on Orthogonal Frequency-Division Multiplexing (OFDM) and Single-Carrier Frequency-Division Multiple Access (SC-FDMA), which is also known as the Long Term Evolution of UTRAN, or Evolved Universal Terrestrial Radio Access Network (E-UTRAN). Detailed UTRAN radio access specifications are described in the 25-series of 3GPP specifications, while E-UTRAN specifications are found in the 36-series. LTE was introduced in 3GPP Release 8, but the development and future evolution of both HSPA and LTE continues in parallel in 3GPP Releases 9, 10 and so on.

Various frequency bands are typically allocated and/or sold by government organizations, such that an operator may "own" certain bands for a particular use. In some cases, government regulations may specify that the owner, i.e., the operator, should deploy a particular technology in a particular frequency band. In some cases, the operator may be able to choose what technology and standard to deploy in their spectrum provided the choices fulfill certain criteria set up by, for example, the International Telecommunications Union (ITU).

As a consequence of the fact that spectrum is a scarce resource, an operator may have the rights to deploy a new cellular access, such as LTE, in a limited spectrum, such as 20 MHz. However, the fact that the operator may have an existing customer base with existing terminals may prevent the operator from deploying only a single technology across the whole spectrum owned by the operator. This could be the case, for example, for an operator that has a large existing customer base with WCDMA/HSPA subscriptions using the UTRAN network, but who wants to deploy the most recent evolution, the Long Term Evolution (LTE) of UTRAN, also called E-UTRAN.

In this example, the operator may then have to divide the available bands between HSPA and LTE. At initial deployment of LTE, the operator may thus continue to use, for example, 10 MHz (corresponding to two WCDMA carriers) for HSPA and reserve 10 MHz for initial LTE deployment.

However, such partitioning of a scarce spectrum resource to different technologies has some undesired effects on performance. First, there is a direct correlation between the peak-rate that can be offered and the spectrum width that is used. Thus, limiting the bandwidth of both HSPA and LTE to 10 MHz in the example above will roughly limit the peak-rate offered to customers to one-half of that which could be supported if the entire spectrum was utilized for a single access technology. Assuming for the sake of illustration that each of the technologies can offer around 100 Mbps in 20 MHz, it will mean that the peak-rate will now be limited to around 50 Mbps in each of the technologies. Second, it may happen that the HSPA carriers are very loaded for some time after the newer technology is deployed, while the LTE carriers in the example only have a few users. Thus, there would be an imbalance between allocation and use, resulting in undesired congestion on the HSPA carriers and underutilization of the spectrum allocated to LTE. However, in order to offer a commercially acceptable bit-rate on the LTE carriers, it is still not possible to allocate, for example, only 5 MHz to LTE customers, since then the LTE evolution would not provide competitive performance in relation to HSPA.

Accordingly, there is a need for improved approaches to utilizing the limited spectrum resource while simultaneously deploying multiple radio access technologies.

In the published European patent application EP 2 203 001 A1, methods and apparatuses for adapting bandwidth usage in a cellular communication network are disclosed. A bandwidth assignment means assigns dynamically one portion of a bandwidth to one radio access technology and another portion of the bandwidth to another radio access technology based on the number of supportive mobile terminals and the level of traffic for the different radio access technologies. Such approach may compensate for relatively slowly varying use of the different radio access technologies. However, the available peak-rate will still be limited if not all the bandwidth may be utilized for one technology at a time. Moreover, fast variations in load for the different radio access technologies may be difficult to handle.

3GPP is currently progressing on a project called "IP Flow Mobility and seamless WLAN offload" (IFOM), the details of which are being captured in 3GPP TS 23.261. In this work, the idea is that a User Equipment (UE) can be simultaneously connected to Wireless Local Area Network (WLAN) and 3GPP accesses (such as HSPA or LTE), so that selected Internet Protocol (IP) flows can be routed over WLAN to offload the cellular access. However, in this approach each IP flow (e.g., a Transmission Control Protocol (TCP) connection) must take one or the other of the routes (i.e., either cellular or WLAN), and high peak rates can only be achieved if the UE is simultaneously using several IP flows that load both accesses evenly and simultaneously. Thus, the IFOM approach does not offer any benefits with regards to peak rates if a user downloads a single file or connects to one particular server via a single connection or flow.

Furthermore, since the connections over WLAN and the cellular access may exhibit different latencies, there is also a risk of severe re-ordering of packets. Thus, while IFOM provides a mechanism for offloading the cellular access, it does not offer a solution to the aforementioned problems related to peak rates in the scenario described above. Since the aggregation of different IP flows is performed above the radio access layers, it will mean that fast load-balancing between the access technologies is not possible, or at least, very demanding.

The mechanism used to setup IFOM is purely UE-based, and there is no coordination between the two accesses on radio network level, meaning the two access networks are not aware of that IFOM is used.

In the published international patent application WO 2007/078663 A2, a mobility middleware architecture for multiple radio access technology apparatuses is disclosed. Such middleware operates in a similar manner as in IFOM discussed above, and may provide a user with access to a Frequency Division Duplex (FDD) network, for example, simultaneously with access to a WLAN. Different data streams can then be directed to different radio access technologies. This may solve congestion problems if parallel data streams exist for a single user. However, in this case, the peak-rate will still be limited to the portion of the bandwidth that is assigned for each radio access technology.

Wireless communications using multiple radio access technologies simultaneously are disclosed in the published U.S. patent application publication US 2010/0062800 A1. A wireless device has a host controller unit that segments the uplink data stream and provides each of the segmented portions to either a first baseband module corresponding to a first radio access technology or a second baseband module corresponding to a second radio access technology. The segmented portions are combined again into a single data stream in a network entity after radio transmission using the two separate radio access technologies. Such approaches may solve both congestion and peak-rate limitations when being in continuous and non-mobile operation. However, there is no presented detailed strategy how to manage several issues such as initiation or mobility.

SUMMARY

Embodiments of the present invention include methods and devices for managing simultaneous use of more than one radio access technology in a cellular communication system. An example method for managing radio access in a communication system comprises at least one of a set of handling steps for an initiating radio access network and a set of handling steps for a confirming radio access network. The set of handling steps for an initiating radio access network comprises sending of a radio access technology resource aggregation request from a first radio access network to a second radio access network concerning communication with a user equipment connected to a source radio base station of a source radio access network and receiving of a radio access technology resource aggregation request response from the second radio access network to the first radio access network. The set of handling steps for an confirming radio access network comprises receiving of a radio access technology resource aggregation request from a first radio access network to a second radio access network concerning communication with a user equipment connected to a source radio base station of a source radio access network and sending of a radio access technology resource aggregation request response from the second radio access network to the first radio access network. The source radio access network is the first radio access network or the second radio access network. The first radio access network is operating with a first radio access technology and the second radio access network is operating with a second radio access technology different from the first radio access technology. The method further comprises at least one of a set of radio resource reserving steps of a target radio access network and a set of radio resource reserving steps of a source radio access network. The set of radio resource reserving steps of a target radio access network comprises reserving of radio resources of a target radio base station in a target radio access network. The target radio access network is the radio access network, out of the first radio access network and the second radio access network, to which the user equipment is not connected. The set of radio resource reserving steps of a target radio access network further comprises sending of a report of the reserved radio resources from the target radio access network to the source radio access network. The set of radio resource reserving steps of a source radio access network comprises receiving of a report of the reserved radio resources from the target radio access network to the source radio access network and transmitting of a radio access technology resource aggregation command to the user equipment from the source radio access network. The radio access technology resource aggregation command comprises information about that a radio access technology resource aggregation shall be used and information about the reserved radio resources. The source radio base station and the target radio base station have at least partly overlapping coverage areas.

In another embodiment, a method for establishing a radio access technology resource aggregation in a communication system comprises receiving, in a user equipment, of a radio access technology resource aggregation command from a source radio base station of a source radio access network. The radio access technology resource aggregation message comprises information about that a radio access technology resource aggregation shall be used and information about reserved radio resources of a target radio base station of a target radio access network. The source radio access network operates with a first radio access technology. The target radio access network operates with a second radio access technology different from the first radio access technology. The radio base station of the source radio network and the radio base station of the target radio base station have at least partly overlapping coverage areas. The method further comprises setting up, between the user equipment on one hand and the target radio base station and the source base station on the other hand, of a radio access technology resource aggregation according to the reserved radio resources.

In still another embodiment, a node of a first radio access network for use in a communication system comprises a first transceiver that is a transceiver configured to communicate with at least a second radio access network. The first transceiver is configured in at least of an initiating radio access network configuration and a confirming radio access network configuration. In the initiating radio access network configuration, the first transceiver is configured to send a radio access technology resource aggregation request to the second radio access network concerning communication with a user equipment connected to a radio base station of a source radio access network and is further configured to receive a radio access technology resource aggregation request response from the second radio access network. In the confirming radio access network configuration, the first transceiver is configured to receive a radio access technology resource aggregation request from the second radio access network concerning communication with a user equipment connected to a radio base station of a source radio access network and is further configured to transmit a radio access technology resource aggregation request response to the second radio access network. The source radio access network is one of the first radio access network and the second radio access network. The first radio access network operates with a first radio access technology and the second radio access network operates with a second radio access technology different from the first radio access technology. The node further comprises at least one of a target radio access network section and a source radio access network section. In the target radio access network section, the node comprises a resource manager configured to reserve radio resources of a radio base station of the first radio access network. The first transceiver is further configured to report the reserved radio resources from the first radio access network to the second radio access network. In the source radio access network section, the first transceiver is configured to receive, from the second radio access network, a report of reserved radio resources of a target radio base station of the second radio access network. The source radio access network section further comprises a second transceiver configured for communication with at least the user equipment. The second transceiver is further configured to transmit a radio access technology resource aggregation command to the user equipment. The radio access technology resource aggregation command comprises information about that a radio access technology resource aggregation shall be used and information about reserved radio resources of the target radio base station. The radio base station of the source radio access network and the radio base station of the target radio access network have at least partly overlapping coverage areas.

In yet another embodiment, a user equipment for use in a communication system comprises a transceiver configured to communicate with a source radio base station of a source radio access network of the communication system and a target radio base station of a target radio access network of the communication system. The source radio base station and the target radio base station have at least partly overlapping coverage areas. The transceiver is further configured to receive a radio access technology resource aggregation command from the source radio base station. The radio access technology resource aggregation message comprises information about that a radio access technology resource aggregation shall be used and information about reserved radio resources of the target radio base station. The source radio access network operates with a first radio access technology. The target radio access network operates with a second radio access technology different from the first radio access technology. The user equipment further comprises a connection handler, configured to configure the user equipment for setting up a radio access technology resource aggregation to the target radio base station and the source base station, according to the reserved radio resources.

The techniques disclosed herein provide solutions for managing of simultaneous use of multiple radio access technologies. By having this managing in control of the network, such use gives rise to that higher peak rates and load balancing can be offered in heterogeneous deployments including at least two radio-access technologies. The use of these techniques can allow for a gradual introduction of new technologies in a scarce spectrum, while reducing or limiting the adverse effects of resource partitioning.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
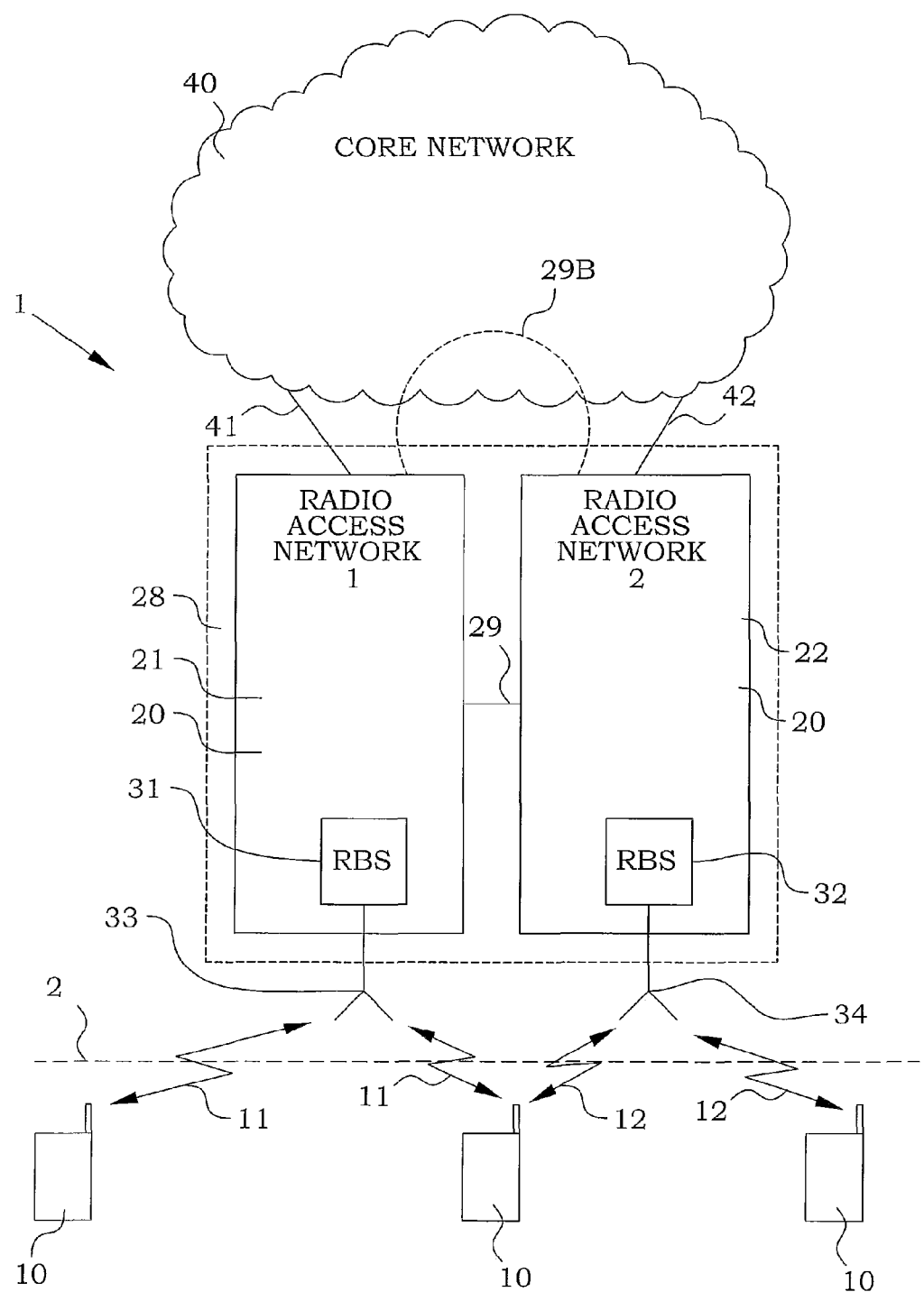
FIG. 1 is a schematic illustration of an embodiment of a communication system utilizing more than one radio access technology.

Throughout the drawings, the same reference numbers are used for similar or corresponding elements.

Various embodiments of the inventive techniques described herein provide a solution for mobile terminals, or UEs in 3GPP parlance, and radio access networks to manage simultaneous aggregation of transmission of data over multiple radio access technologies (RAT) to and from a single UE. This general approach is called RAT aggregation in the discussion that follows. The solutions described herein include methods for setting up, in a network controlled way, the parallel connections to the UE, maintaining the connections and releasing the connections when needed.

Various embodiments of the improved techniques described herein are detailed below, using HSPA and LTE as example access technologies. However, it should be understood that the solutions provided below are generic to any combinations of access technologies, though for clarity reasons, we will now describe a solution where one or multiple HSPA carriers are aggregated with one or multiple LTE carriers. Thus, the inventive techniques disclosed herein are not limited to these exemplary technologies, but are equally applicable to any combination of access technologies, as will be further explained below. Such non-exclusive examples of other access technologies that also are possible to implement the present ideas in are WiMAX (802.16), WLAN (802.11), CDMA (1xRTT, EV-DO), GSM/GPRS etc.

In order to further understand the underlying problems solved by the present invention, certain aspects are further discussed here below. Consider now again the example above, where an operator has 20 MHz available for deployment of HSPA and/or LTE. The operator would now have the choice of deploying all 20 MHz with HSPA or LTE, thereby offering a high peak rate in the chosen technology. However, assuming that the operator has an existing customer base in HSPA, the operator cannot allocate all bandwidth to LTE. Still, the operator has a desire to introduce the most recent evolution of the 3GPP family of standards, namely LTE, and with an associated high peak rate that is commercially attractive.

In a gradual deployment of LTE, the operator could choose an initial allocation of 15 MHz to HSPA services and 5 MHz for the new LTE technology. However, the drawback with this approach is that the peak-rate of an LTE UE may be lower than the peak rate offered with a multi-carrier HSPA solution. This is clearly not desirable. Thus, the operator may split the spectrum in half, such that 10 MHz is offered to HSPA subscriptions, and 10 MHz is provided using LTE technology. Problems with this resource partitioning were already described above, including the peak-rate drawbacks, as well as the issue that the 10 MHz reserved for the legacy technology might be congested while the new technology might initially be under very low load.

Now, it is realized that a large population of the UEs will implement both HSPA and LTE technologies. According to present approaches, both technologies are not used simultaneously, but at different times as controlled by the network entities. From a control functionality point of view this means that the UE only has a signaling connection, e.g., a Radio Resource Control (RRC) connection, to one of the access technologies at a given time. When the UE move between the different access technologies the signaling connection will also be relocated. The relocation between the different access technologies can be performed using a inter-access technology (inter-RAT) handover procedure (as described in prior art), where resources are allocated in the target access technology in advance, prior to the UE receiving the the handover command that orders the UE to move to the target access technology.

There are prior art solutions where a simultaneous use of more than one RAT is enabled. However, there are no explicit provisions for enabling mobility, for initiating or releasing such simultaneous use. In the published US patent application 2010/0062800 A1, a host controller unit in the mobile unit generates measurement reports to the wireless communication network. These reports may be used by the host controller unit and the wireless communication network to make decisions about how to use the RAT aggregation. No more suggestions of how such a user equipment controlled decision procedures can be configured in practice are given. However, to have the UE involved in such decision process may introduce conflicts between benefits for the particular user and benefits for the system as a whole. If a UE, being aware of only its own need for radio resources, could decide about RAT aggregation, such procedure could result in that other users, for example, users only having capabilities of one of the RATs, will have reduced available radio resources. Even in setups, where the network has the possibility to prohibit unfavorable radio resource configurations, there might be a lot of unnecessary control signaling between the UE and the networks.

Another aspect of the managing of RAT aggregation is that as long as the recombination of the uplink (UL) data streams in the different RATs and the division of the downlink (DL) data streams in the different RATs are performed in the radio access networks (RAN) of the RATs, it is of almost no interest for the core network (CN) to interfere. The core network will ideally receive/send the entire data stream to one of the RANs and might not even be aware of that the RAT aggregation takes place. In alternative embodiments, an information link may be established between the other RAN and the CN for enabling minor control signaling.

The most advantageous configuration of the RAT aggregation management is to let nodes of the RANs of the different RATs manage the RAT aggregation procedures, and in particular to initiate a setup of RAT aggregation. The nodes of the RANs of the different RATs are preferably also responsible for the release of RAT aggregation and for initiation of inter-cell handover of RAT aggregation sessions.

FIG. 1 illustrates schematically a communication system 1, in this case a wireless communication system. A number of UEs 10 communicates over a radio interface 2 with radio access networks 20, which in turn are connected to a core network 40. The present communication system 1 allows for using more than one RAT in the communication with the UEs 10. The UEs 10 may therefore communicate with radio signals 11 according to a first RAT with an antenna 33 connected to a first Radio Base Station (RBS) 31 of a first RAN 21. Similarly, the UEs 10 may also communicate with radio signals 12 according to a second RAT with an antenna 34 connected to a second Radio Base Station (RBS) 32 of a second RAN 22. In the illustrated example, one of the UEs 10 have capabilities to communication according to both RATs. The first RAN 21 is connected by a connection 41 to the CN 40 and the second RAN 22 is connected by a connection 42 to the CN 40. Furthermore, there are also communication possibilities between the first Ran 21 and the second RAN 22, as illustrated by the inter-RAT connection 29. Such an inter-RAT connection may also be mediated via the CN 40, as illustrated by the inter-RAT connection 29B. The first RAN 21 and the second RAN 22 may, as illustrated by the broken box 28 be comprised in the same radio access unit, or may in alternative examples be implemented as separate units or partly separate units.

Figure 2:
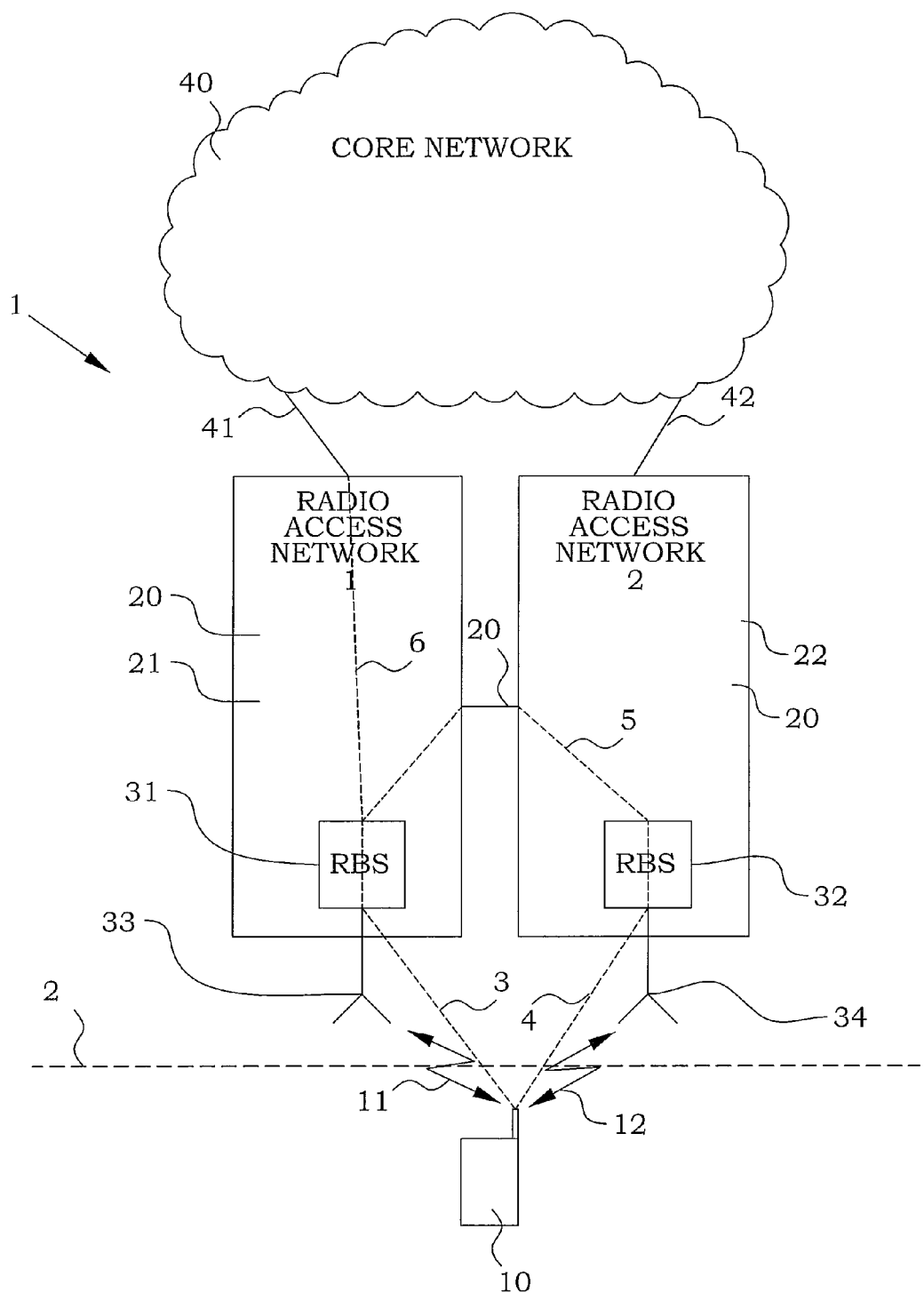
FIG. 2 is a schematic illustration of an embodiment of a communication system utilizing RAT aggregation.

RAT aggregation is in the present disclosure defined as the simultaneous use of radio resources of more than one RAT for one and the same data stream. FIG. 2 illustrates one example of such a RAT aggregation. In UL traffic, the UE 10 transmits a part of the UL data over a first radio link 3 to the first RAN 21 and another part of the UL data over a second radio link 4 to the second RAN 22 and via an inter-RAN link 5 to the first RAN 21. The different parts of the UL data is combined and sent via a common link 6 to the CN 40. In DL traffic, DL data is sent from the CN via the common link 6 to the first RAN 21. A part of the DL data is transmitted over the first radio link 3 to the UE 10. Another part of the DL data is transmitted via the inter-RAN link 5 to the second RAN 22 and then over the second radio link 4 to the UE, where it is combined with the DL data sent over the first radio link 3. The RAT aggregation may concern the DL traffic, the UL traffic or both.

In the configuration of the embodiment of FIG. 2, one of the RANs, in this case the first RAN 21, acts as a primary RAN, from which the common link 6 emanates. The second RAN 22 is in this embodiment denoted a secondary RAN 21. The CN 40 does not necessarily have information about that the secondary RAN is involved in the RAT aggregation.

In order to manage a RAT aggregation, information about the UE capabilities has preferably to be available for the nodes initiating the RAT aggregation, i.e., according to the present disclosure nodes in the RANs. Otherwise, attempts to set up RAT aggregation UEs that do not support RAT aggregation may cause unnecessary signaling. Some sort of mechanism for letting the radio nodes in the RANs knowing that the UE in question support RAT aggregation is therefore preferred. This may be provided by the UE transmitting information to the radio nodes in the RANs whether it supports RAT resource aggregation or not. The information can be stored either in radio nodes, such as a Radio Network Controller (RNC) or an evolved Node-B (eNB), or in the CN. The information can be transmitted between radio nodes and/or core network nodes during handover. The information can advantageously be included in the general UE radio access capabilities information elements and handled as normal UE radio access capabilities or the information can be alternatively handled as a separate information element transmitted in signaling protocols (e.g., RRC, NAS, S1-AP, X2-AP).

Figure 3:
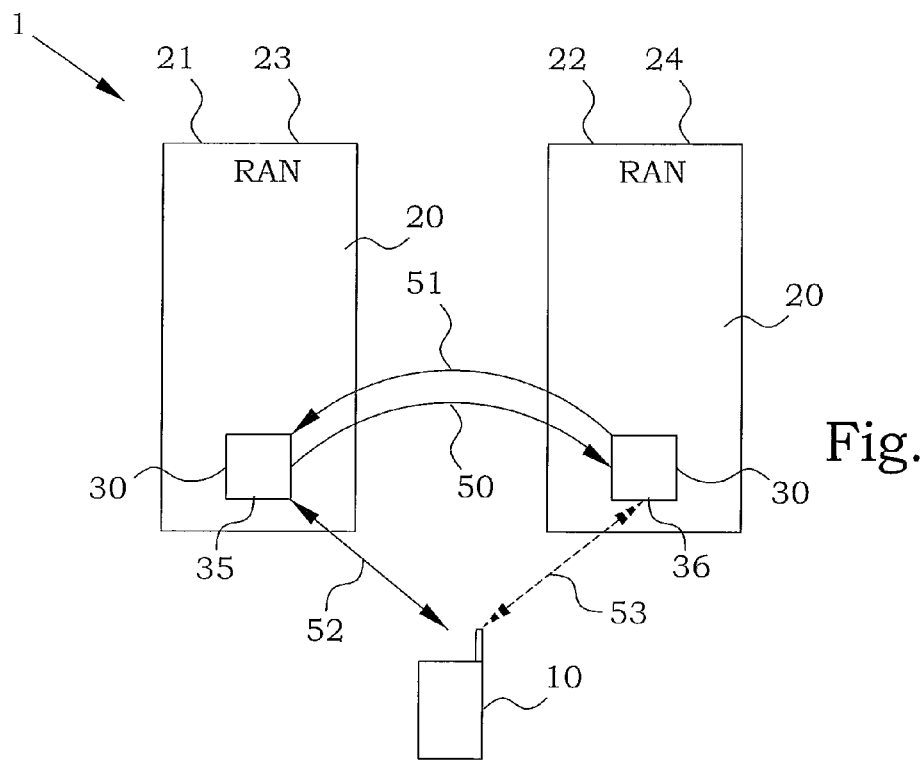
FIG. 3 is a schematic illustration of an embodiment of a communication system configured for RAT aggregation initiation.

FIG. 3 illustrates schematically an embodiment of a communication system 1. The first RAN 21 operates with a first RAT. The second RAN 22 operates with a second RAT different from the first RAT. The first RAN 21 and the second RAN 22 are in communication contact with each other. Both the first RAN 21 and the second RAN 22 comprises in this embodiment a respective radio access manager 30. In this embodiment, the first RAN 21 comprises an initiating radio access manager 35 and the second RAN 22 comprises a confirming radio access manager 36. In alternative embodiment, the radio access managers 30 of one or both RANs can be configured to be both an initiating radio access manager and a confirming radio access manager, as will be explained further below.

Figure 4:
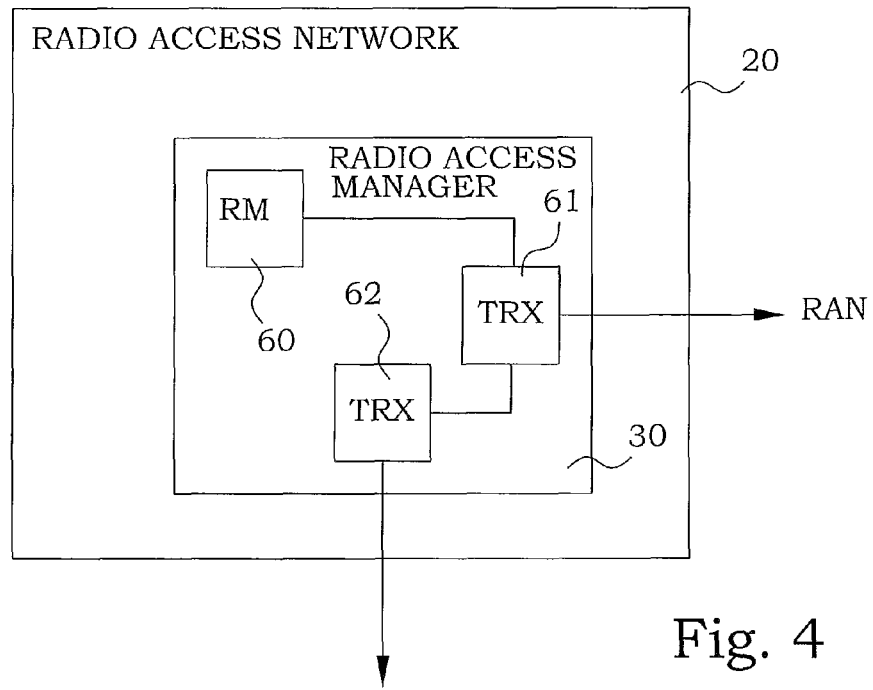
FIG. 4 is a schematic illustration of an embodiment of a radio access network configured for RAT aggregation management.

One embodiment of a radio access manager 30 is illustrated schematically in FIG. 4. A RAN 20, for use in a communication system, comprises a radio access manager 30. The radio access manager 30 comprises a transceiver 61, configured for inter-RAN communication. The transceiver 61 is thus a transceiver configured to communicate with at least a second RAN. In case the radio access manager 30 is an initiating radio access manager, the first transceiver 61 is configured to send a radio access technology resource aggregation request to the second radio access network. The transceiver 61 is then also further configured to receive a radio access technology resource aggregation request response from the second radio access network. In case the radio access manager 30 is a confirming radio access manager, the transceiver 61 is configured to receive a radio access technology resource aggregation request from the second radio access network. The transceiver 61 is then also further configured to transmit a radio access technology resource aggregation request response to the second radio access network.

Returning to FIG. 3, the initiating radio access manager 35 of the first RAN 21 thereby has means for sending a radio access technology resource aggregation request 50 to the confirming radio access manager 36 of the second RAN 22, which confirming radio access manager 36 has means for receiving the radio access technology resource aggregation request 50. The radio access technology resource aggregation request concerns communication with a user equipment 10 connected to a radio base station of a source RAN 23. The source RAN 23 is generally one of the first RAN 21 and the second RAN 22. In the present embodiment, the first RAN 21 is the source RAN 23. The RAN to which the user equipment 10 is going to be connected by the RAT aggregation is denoted a target RAN 24, and in the present embodiment, this is the second RAN 22. The radio base station of the source RAN 23 and the radio base station of the target RAN 24 have at least partly overlapping coverage areas, in order to enable simultaneous communication with a UE 10. The confirming radio access manager 36 of the second RAN 22 furthermore has means for transmit the radio access technology resource aggregation request response 51 to the initiating radio access manager 35 of the first RAN 22, which initiating radio access manager 35 has means for receiving the radio access technology resource aggregation request response 51.

Now again considering FIG. 4, a radio access manager 30 of a target radio access network 24 comprises a resource manager 60. The resource manager is configured to reserve radio resources of a radio base station of the target radio access network 24. The target radio access network is the radio access network, out of the first radio access network and the second radio access network, to which the user equipment is not connected. These reserved radio resources are intended to be a part of the RAT aggregation. The transceiver 61 of the radio access manager 30 of the target radio access network 24 is in this embodiment further configured to report the reserved radio resources from the target radio access network to the source radio access network.

The transceiver 61 of a radio access manager 30 of a source radio access network 24 is further configured to receive, from the target radio access network, a report of reserved radio resources of a radio base station of the target radio access network. The radio access manager 30 of the source radio access network 24 further comprises a second transceiver 62. The second transceiver 62 is configured for communication with at least the user equipment 10. The second transceiver 62 is further configured to transmit a radio access technology resource aggregation command to a UE 10.

Again referring to FIG. 3, the source RAN 23 is in this embodiment the first RAN 21 and the target RAN 24 is in this embodiment the second RAN 22. The reservation of radio resources thus takes place in the second RAN 22 and the report of the reserved radio resources is sent to the first RAN 21. This is preferably performed in conjunction with the radio access technology resource aggregation request response 51. The radio access technology resource aggregation request response 51 could provide data fields in which information about reserved radio resources could be included, for example. The information about reserved radio resources is then included in an appropriate format in the radio access technology resource aggregation command 52, which is sent to the UE 10. The radio access technology resource aggregation command comprises information about that a radio access technology resource aggregation shall be used and information about reserved radio resources of the radio base station of the target RAN 24. The UE 10 then sets up a connection 53 to the target RAN 24, while maintaining the connection to the source RAN 23.

As indicated above, the roles of the RANs may be different and may also change from one occasion to another. A RAN may be predestinated to operate as an initiating RAN. In such embodiments, the functionalities concerning the confirming operations are not necessary. Likewise, a RAN may also be predestinated to operate as a confirming RAN, in which case the functionalities concerning the initiating operations are not necessary. However, in a preferred embodiment, the RAN is configured to operate as an initiating RAN or a confirming RAN depending on the actual situation.

Also, a RAN may be predestinated to operate only as a source RAN. In such a case, the resource manager may be omitted. Likewise, a RAN may be predestinated to operate only as a target RAN. In such a case, the transceiver for communication with the UE may not have have to have functionalities for supporting the transmission of the radio access technology resource aggregation command. However, also here, it is preferable if the RAN is configured to operate as a source RAN or a target RAN depending on the actual situation.

A few more embodiments will be discussed here below to illustrate the different possibilities.

Figure 5:
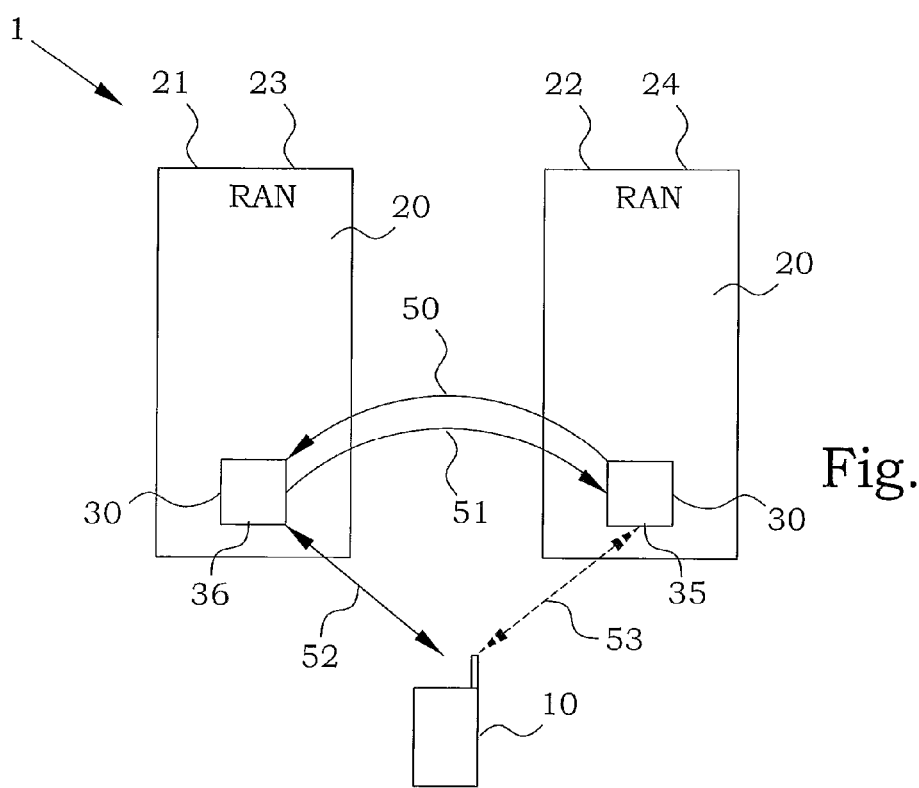
FIGS. 5-7 are schematic illustration of other embodiments of communication systems configured for RAT aggregation initiation.

In FIG. 5 another embodiment of a communication system 1 is schematically illustrated. In this embodiment, the radio access manager 30 of the second RAN 22 is the initiating radio access manager 35. For instance, if the first RAN has sent a request for an inter-RAT handover to the second RAN 22, the second RAN knows that the UE 10 presently is connected to the first RAN 21. The second RAN 22 may then conclude that a RAT aggregation would be even better. By consulting available general UE radio access capabilities information about the UE 10 in question, the second RAN 22 could check that the UE 10 admits RAT aggregation. The radio access manager 30 of second RAN 22 may then act as an initiating radio access manager 35, sending a radio access technology resource aggregation request 50 to the confirming radio access manager 36 of the first RAN 21. The confirming radio access manager 36 of the first RAN 21 can then confirm by returning a radio access technology resource aggregation request response 51. The first RAN 21 is, however, still the source RAN 23, and needs therefore information about reserved radio resources of the second RAN 22, i.e., the target RAN 24. The target RAN 24 reserves radio resources and may send the information to the source RAN 23 either as a part of the radio access technology resource aggregation request 50 itself or as a separate message. The source RAN 23 may then proceed with informing the UE 10 about the RAT aggregation in the same manner as above.

Figure 6:
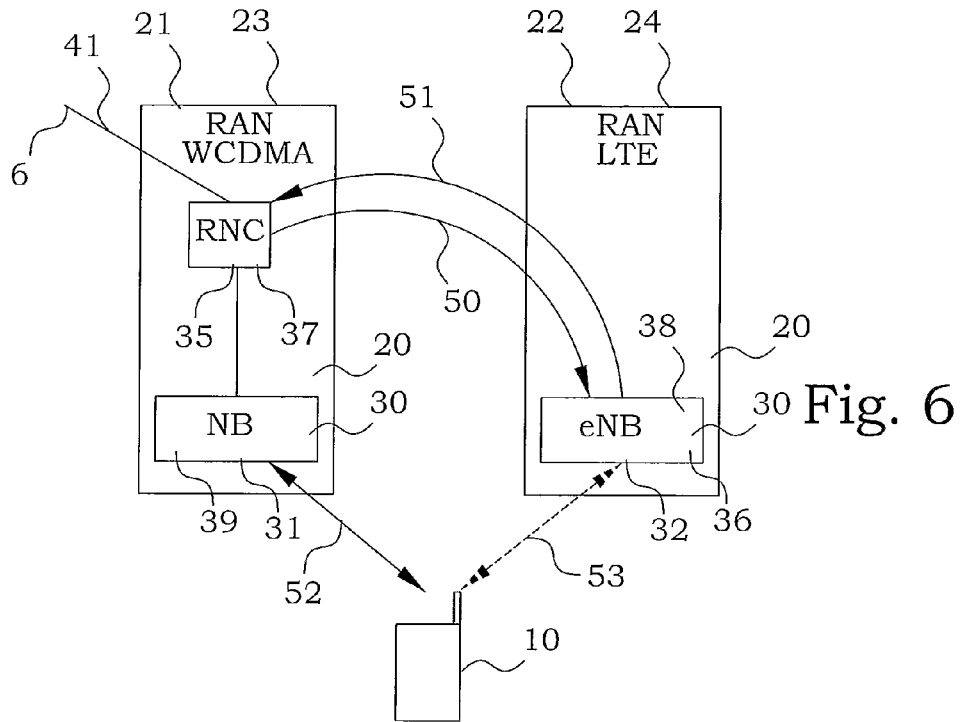

FIG. 6 illustrates schematically an embodiment of a communication system 1 having a first RAN 21 based on WCDMA and a second RAN 22 based on LTE. The first radio base station 31 is thus a Node B (NB) 39 of the WCDMA RAN and the second radio base station 32 is an extended Node B (eNB) 38 of the LTE RAN. In this embodiment, a Radio Network Controller (RNC) 37 operates as the initiating radio access manager 35 and the eNB 38 operates as the confirming radio access manager 36. In this embodiment, the first RAN 21 is the source RAN 23 and the second RAN 22 is the target RAN 24. After establishing the RAT aggregation, the first RAN 21 is in this particular embodiment arranged as a primary RAN, whereby the connection 41 to the CN is used for establishing the common link 6 for the data traffic to and from the CN. This mean that the WCDMA RAN in this embodiment is used for the communication with the CN. In alternative embodiments, the RAT aggregation may be configured in such a way that the second RAN 22 operates as a primary RAN. In that embodiment, the LTE is used for the communication with the CN.

Figure 7:
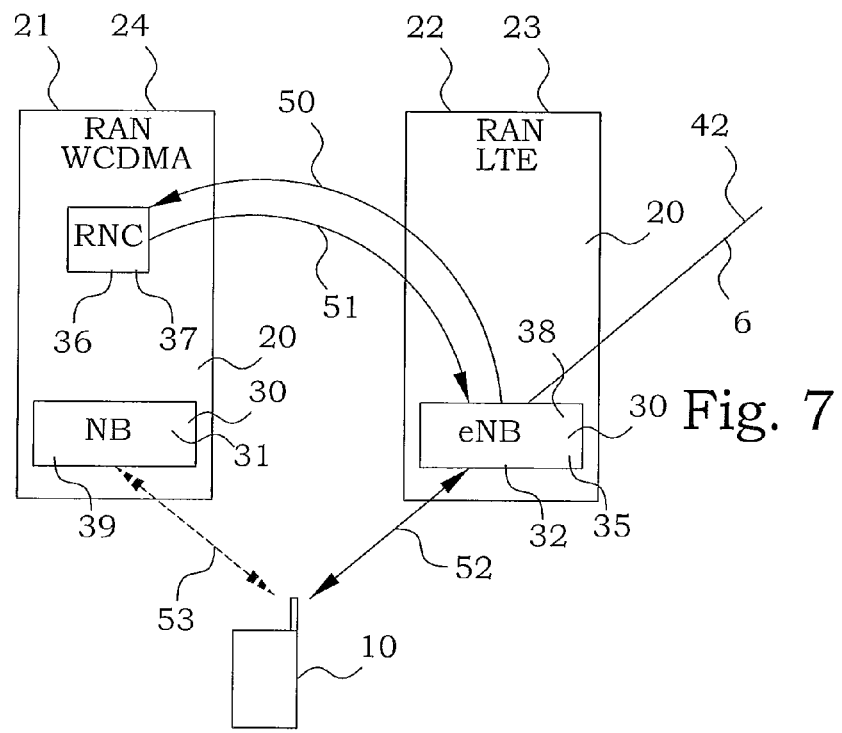

FIG. 7 illustrates schematically another embodiment of a communication system 1 having a first RAN 21 based on WCDMA and a second RAN 22 based on LTE. In this embodiment, the UE 10 is originally connected to the second RAN 22, i.e., to the LTE RAN. The second RAN 22 is therefore in this embodiment the source RAN 23, while the first RAN 21 is the target RAN 24. Likewise, the eNB 38 of the second RAN 22 acts as the initiating radio access manager 35 and the RNC 37 of the first RAN, i.e., the WCDMA RAN, acts as the confirming radio access manager 36. The second RAN 22 is in this embodiment the primary RAN, and the first RAN 21 is the secondary RAN, which means that the connection 42 to the CN is used for establishing the common link 6 for the data traffic to and from the CN. Also here, in an alternative embodiment, the RAT aggregation can be configured in such a way that the first RAN 21 becomes the primary RAN and the second RAN 22 becomes the secondary RAN.

Figure 8:
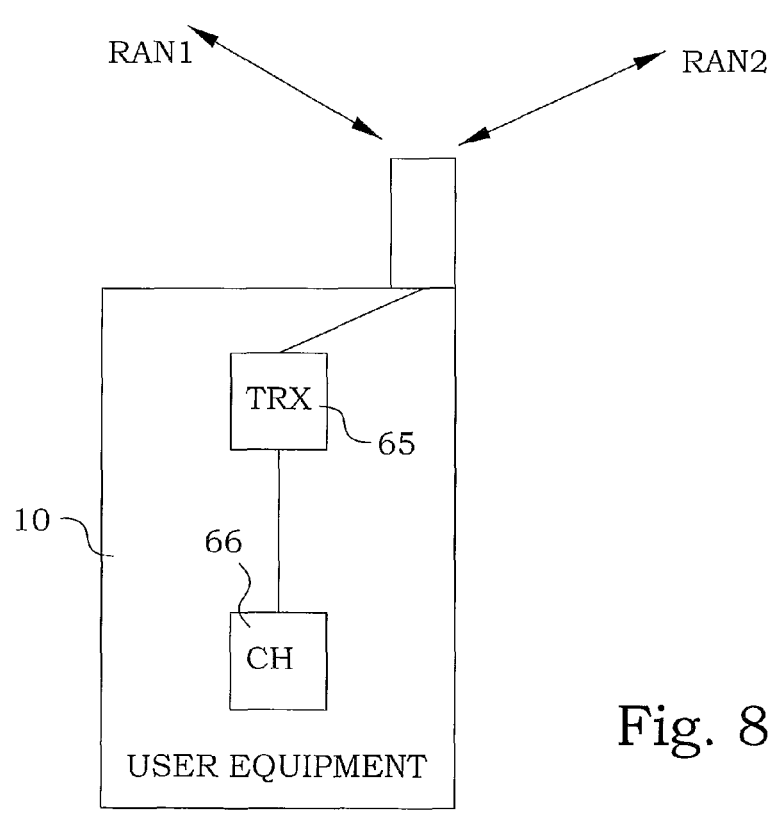
FIG. 8 is a schematic illustration of an embodiment of a user equipment configured for allowing RAT aggregation.

FIG. 8 illustrates schematically an embodiment of a UE 10 for use in a communication system having more than one available radio access technology. The UE 10 comprises a transceiver 65. The transceiver 65 is configured to communicate with radio base stations of the communications system. More specifically, the transceiver 65 is configured to communicate with a source radio base station of a source radio access network of the communication system and a target radio base station of a target radio access network of the communication system. The source radio base station and the target radio base station have at least partly overlapping coverage areas. The transceiver 65 is further configured to receive a radio access technology resource aggregation command from the source radio base station. The radio access technology resource aggregation message comprises information about that a radio access technology resource aggregation shall be used and information about reserved radio resources of the target radio base station. The source radio access network operates with a first radio access technology and the target radio access network operates with a second radio access technology different from the first radio access technology. The UE 10 also comprises a connection handler 66. The connection handler is configured to configure the UE 10 for setting up a radio access technology resource aggregation to the target radio base station and the source base station, according to the reserved radio resources.

In a particular embodiment, the transceiver 65 is further configured to transmit information about that the UE 10 supports RAT resource aggregation to the communication system, as discussed further above.

Figure 9:
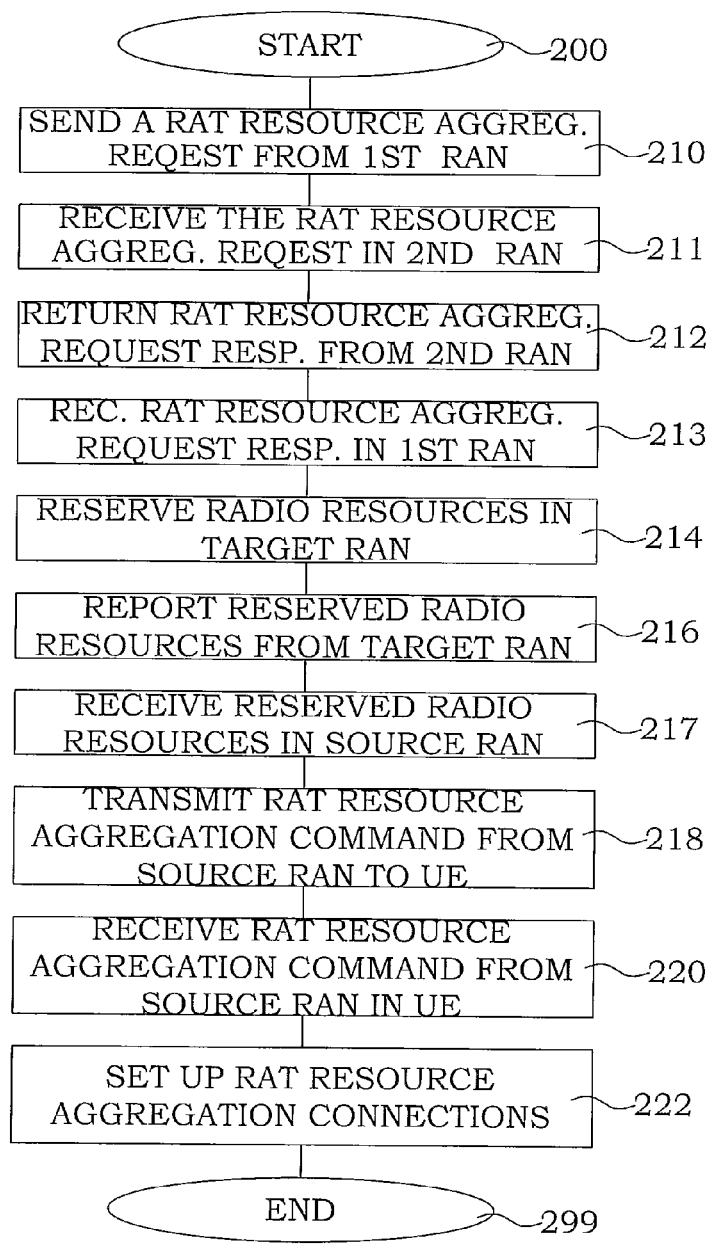
FIG. 9 is a flow diagram of steps of an embodiment of a method for RAT aggregation managing.

The procedures for managing a RAT aggregation can also be illustrated as a flow of steps. FIG. 9 is a flow diagram of steps of embodiments of methods according to the present invention. The method for managing radio access in a communication system starts in step 200. In step 210, a radio access technology resource aggregation request is sent from a first radio access network to a second radio access network. The radio access technology resource aggregation request concerns communication with a user equipment connected to a source radio base station of a source radio access network. The radio access technology resource aggregation request is thus an initiation of a procedure to set up a RAT aggregation configuration. In step 211, the radio access technology resource aggregation request is received in the second radio access network from the first radio access network. In response to this, in step 212, a radio access technology resource aggregation request response is sent from the second radio access network to the first radio access network. In step 213, the radio access technology resource aggregation request response is received in the first radio access network from the second radio access network. The source radio access network is the first radio access network or the second radio access network. The first radio access network operates with a first radio access technology and the second radio access network operates with a second radio access technology different from the first radio access technology.

The steps 210-213 define a communication between an initiating RAN and a confirming RAN. Steps 210 and 213 are performed in the initiating RAN, while steps 211-212 are performed in the confirming RAN. Therefore, at each separate occasion, each RAN does only perform one of the sets of steps, i.e., either step 210 and 213 or step 211 and 212. However, in certain embodiments, the devices performing the steps are prepared for allowing either set of steps to be performed, depending on the situation.

In step 214, radio resources of a radio base station in a target radio access network are reserved. The target radio access network is the radio access network, selected among the first radio access network and the second radio access network, to which the user equipment is not connected. The radio base station of the source radio access network and the radio base station of the target radio access network having at least partly overlapping coverage areas. In step 216, a report of the reserved radio resources is sent from the target radio access network to the source radio access network. The report of the reserved radio resources is received in the source radio access network from the in step 217. The source radio access network has now enough information for instructing the UE about the intended RAT aggregation setup. Therefore, in step 218, a radio access technology resource aggregation command is transmitted from the source radio access network to the user equipment. The radio access technology technology resource aggregation command comprises information about that a radio access technology resource aggregation shall be used and information about the reserved radio resources.

The steps 214-218 define a process of arranging for radio resources and transferring data concerning such reserved radio resources from the target RAN via the source RAN to the UE. Steps 214 and 216 are performed in the target RAN, while steps 217 and 218 are performed in the source RAN. Therefore, at each separate occasion, each RAN does only perform one of the sets of steps, i.e., either step 214 and 216 or step 217 and 218. However, in certain embodiments, the devices performing the steps are prepared for allowing either set of steps to be performed, depending on the situation.

At each occasion, each RAN acts as an initiating RAN or a confirming RAN, and as a target RAN or a source RAN.

Steps 220 and 222 concerns steps performed in the UE. In step 220, a radio access technology resource aggregation command is received in a user equipment. The radio access technology resource aggregation command is received from a source radio base station of a source radio access network. The radio access technology resource aggregation message comprises information about that a radio access technology resource aggregation shall be used and information about reserved radio resources of a target radio base station of a target radio access network. The source radio access network operates with a first radio access technology and the target radio access network operating with a second radio access technology different from the first radio access technology. The source radio base station and said target radio base station have at least partly overlapping coverage areas. In step 222, a radio access technology resource aggregation is set up between the user equipment on one hand and the target radio base station and the source base station on the other hand. The radio access technology resource aggregation is set up according to the reserved radio resources.

The procedure ends in step 299.

The above presented procedures have, despite the differing objectives, many structural similarities with inter-RAT handover procedures. In one aspect, one might even consider the procedure according to certain embodiments of the present invention as a novel type of handover procedure—a RAT aggregation handover. However, in order to understand the fundamental differences, inter-RAT handover will briefly be discussed here below.

A conventional approach in heterogeneous access technology deployments is to perform Inter-RAT handover between two or more systems. This approach may solve the load-balancing issue discussed further above, but it does not address the problems related to peak rate also described further above. User Equipments of today typically support several access technologies (such as GSM/GPRS/Enhanced Data for GSM Evolution (EDGE) and HSPA). A network can typically hand over UEs between the different access networks for various reasons, such as for load-balancing or coverage reasons.

Figure 10:
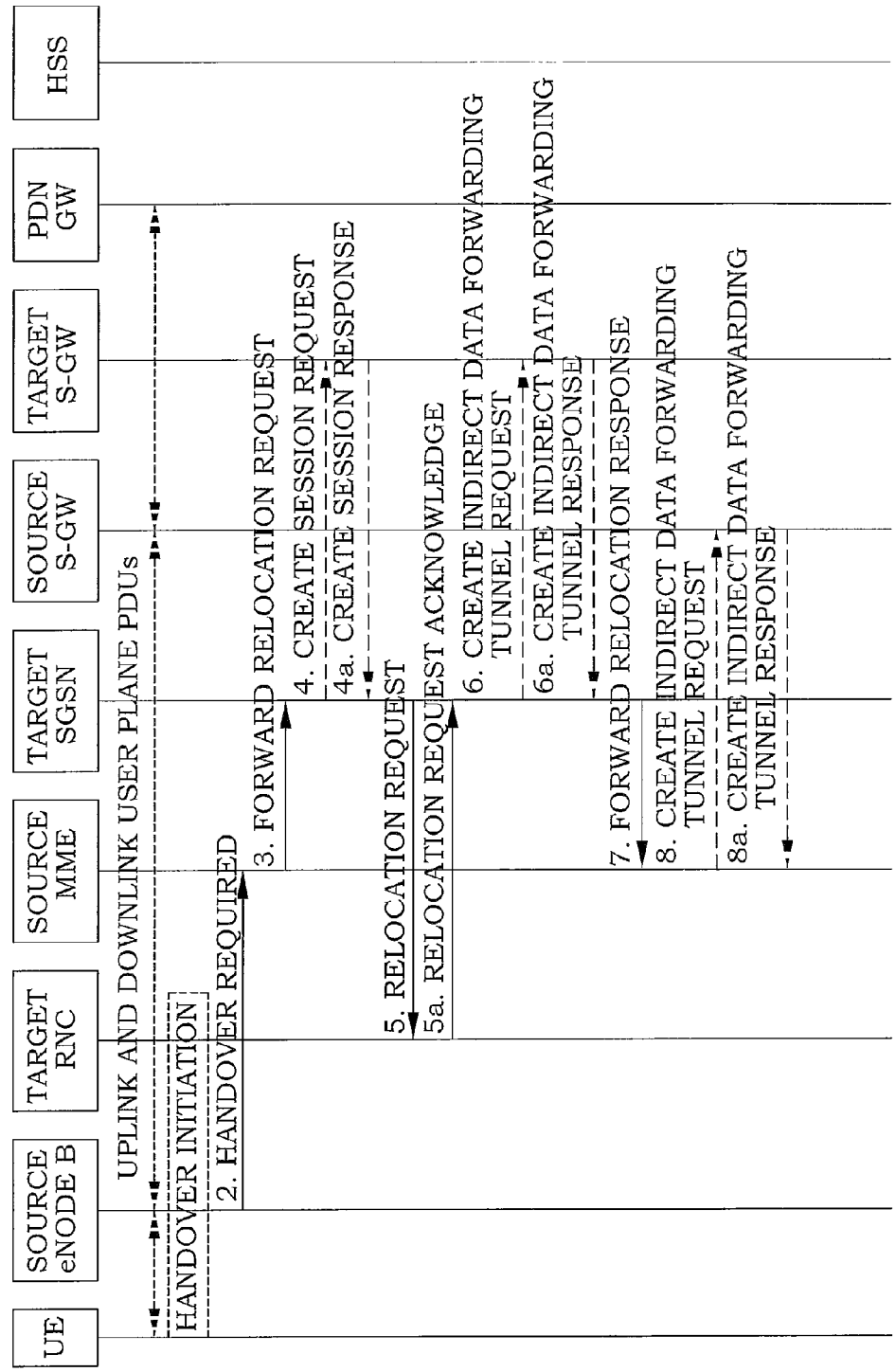
FIG. 10 is a signaling diagram for the preparation phase of an example of an inter-RAT handover procedure.
Figure 11A:
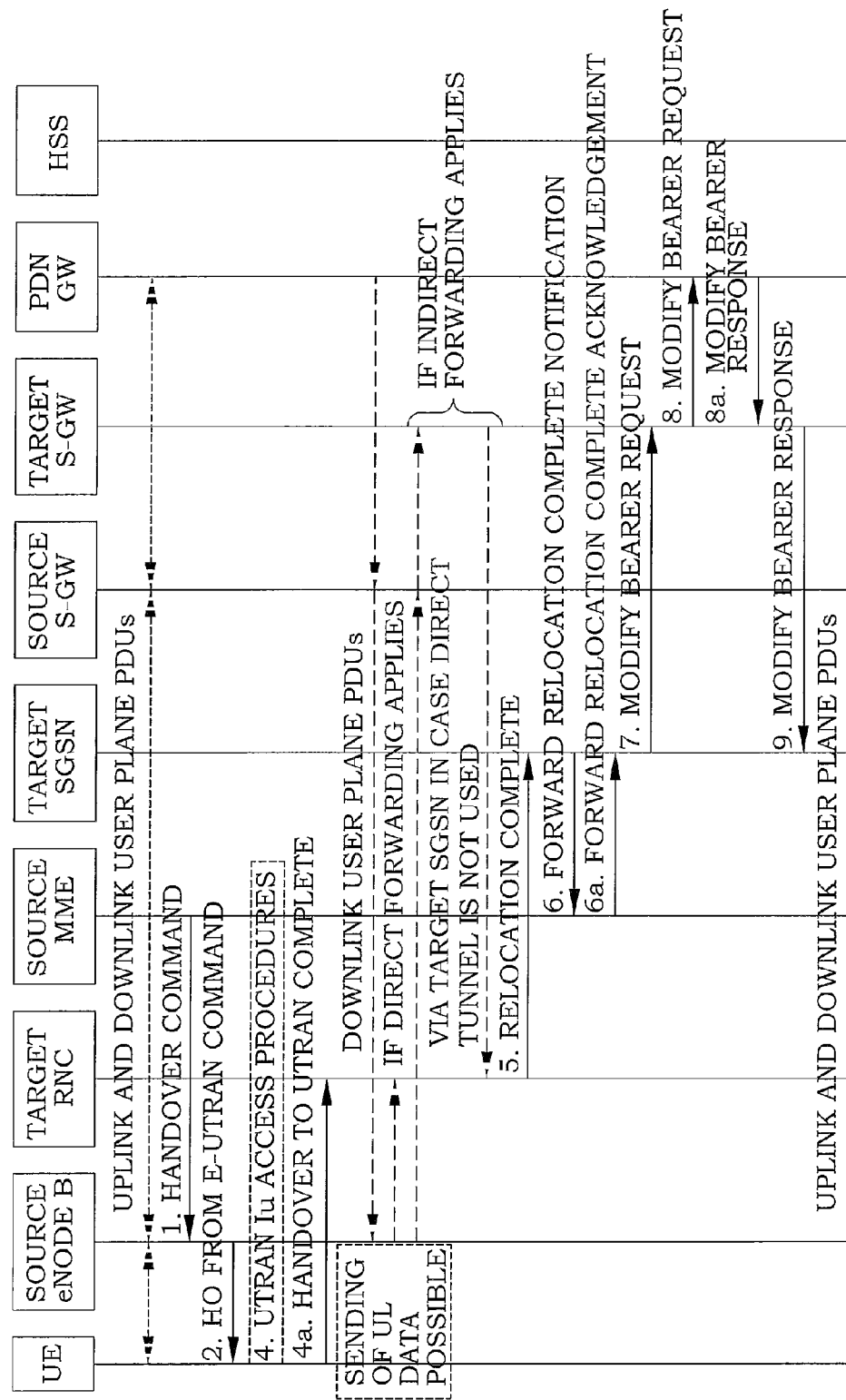
FIGS. 11A-B are together a signaling diagram for the execution phase of an example of an inter-RAT handover procedure.
Figure 11B:
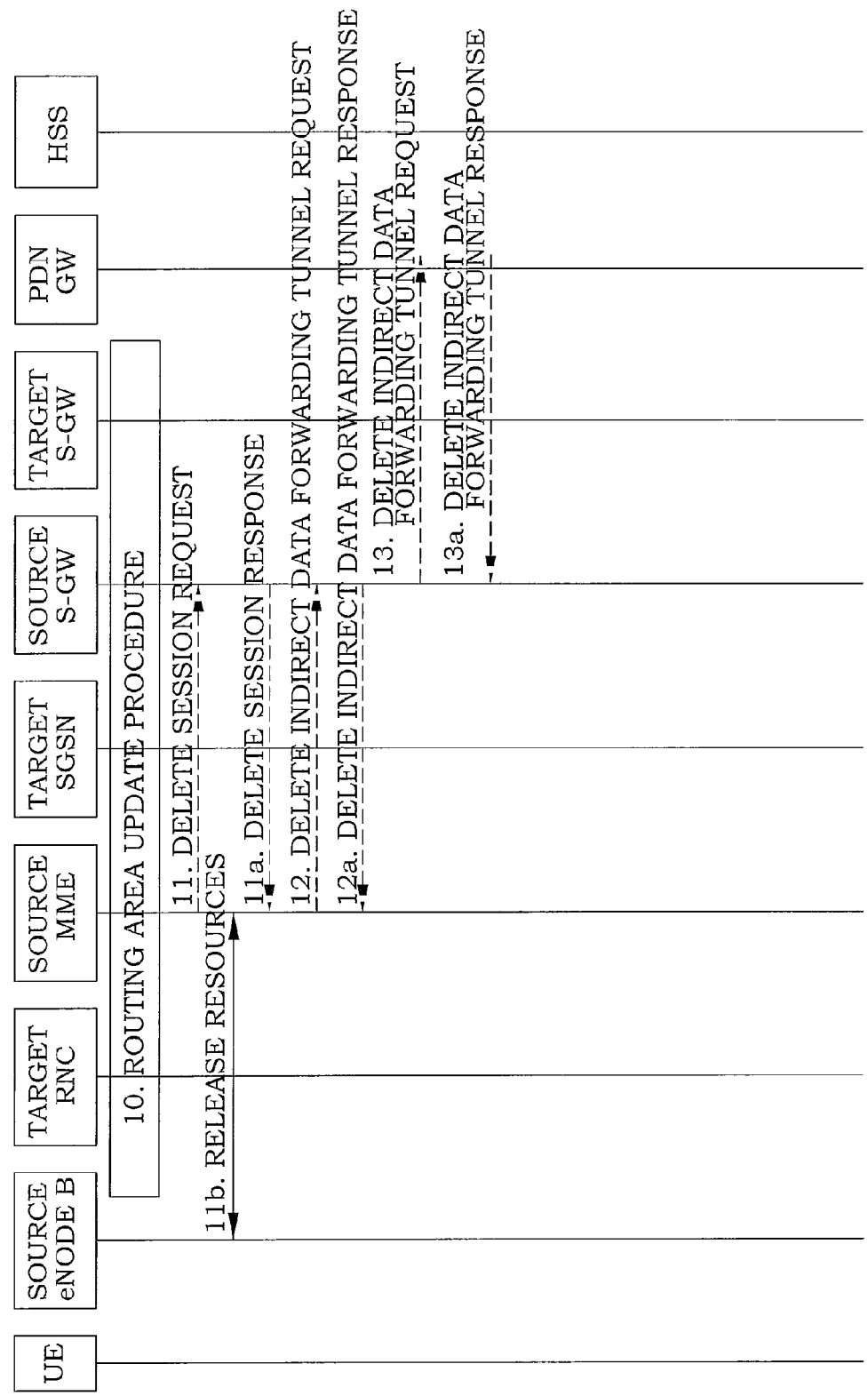

As an example, the conventional handover procedure from LTE (E-UTRAN) to HSPA (UTRAN) is illustrated in FIGS. 10, 11A and 11B based on the definitions of 3GPP TS 23.401. Other inter-RAT handover scenarios are also described in 3GPP TS 23.401. Important to note about the existing inter-RAT handover procedures is that they can be divided into two phases—a preparation phase and an execution phase.

During the preparation phase, the source RAT provides the target RAT with UE specific configuration information, including security, QoS, UE capability information etc. Resources are allocated in the target RATs radio nodes, such as the eNB or RNC. The target RAT will also perform admission control. For example, it has a chance to reject the handover if it is too congested. The target RAT generates a "handover command", a RRC control message, which is tunneled back transparently to the source RAT.

During the execution phase, the source RAT transmits the "handover command" to the UE. The UE, upon reception of the "handover command", leaves the source RAT and perform access in the target RAT.

As described before, the presently presented procedures can in particular embodiments be implemented as enhancements added to the inter-RAT handover procedure, making it possible to also use it to setup simultaneous connections between the UE and all the involved RATs. This particular solution is generally directed to improvements to existing handover functionality, making it possible to support simultaneous connections.

The following enhancements to the inter-RAT procedure are considered. During the RAT aggregation handover, the source RAT includes an indication to the target RAT that the source RAT wants to setup simultaneous connections from the UE to both RATs, i.e., allowing RAT aggregation. During the RAT aggregation handover, the source RAT includes configuration information to the target RAT in order to allow RAT aggregation. The configuration information can include information about how to configure the UE, how to setup user plane tunnels, as well as other information. During the RAT aggregation handover, the target RAT includes an indication to the source RAT that aggregation shall be used. During the RAT aggregation handover, the target RAT includes configuration information to the source RAT, in order to allow RAT aggregation. The configuration information can include information about how to configure the UE, how to setup user plane tunnels, as well as other information. During the RAT aggregation handover, the target RAT includes an indication to the UE that aggregation shall be used. During the RAT aggregation handover, the target RAT includes configuration information to the UE in order to allow RAT aggregation. The configuration information can include information about the user or control protocol configuration, as well as other information. During the handover, the source RAT includes an indication to the UE that aggregation shall be used. During the RAT aggregation handover preparation phase, the source RAT includes configuration information to the UE in order to allow RAT aggregation. The configuration information can include information about the user or control protocol configuration as well as other information.

It should be noted that not all of the enhancements need to be used in any given embodiment. It should also be noted that the signaling between the RATs and between the RATs and UE can be transmitted via intermediate nodes, such as Core Network nodes.

Some UE-specific features of the techniques described herein are related to the specific mechanisms described above. A UE that supports RAT aggregation will provide information to the network indicating that it supports RAT aggregation. The information can also contain specific information for which RATs, frequency bands, etc., and/or that RAT aggregation is supported. It may also contain other information related to RAT aggregation, such as more detailed information about supported configurations. A UE that supports RAT aggregation will, when connected to one RAT, receive configuration information indicating that RAT aggregation shall be setup. The information can contain configuration data for the secondary RAT. The configuration data can include cell information, such as frequencies, identities, or cell configuration, as well as user and control protocol configuration. As a result of receiving information that RAT aggregation should be used, the UE can setup the connection to the other RAT. The setup procedure can include the transmission and reception of signaling message to and from the new and/or old RAT. The connection related to the old RAT will be kept.

A user-plane architecture for Inter-RAT carrier aggregation was briefly mentioned above. In one embodiment of such an architecture, a solution is introduced for supporting simultaneous aggregation of transmission of data over multiple access technologies, where a first Medium Access Control (MAC) Protocol Data Unit (PDU) associated with a first access technology is transmitted over a second radio access technology, tunneled within a MAC PDU of the second radio access technology.

Systems employing this approach utilize two (or more) sets of Hybrid Automatic Repeat-reQuest (HARQ) processes, where a first set of HARQ processes are operated on the first access technology and a second set of HARQ processes are operated on a second, differing, access technology.

According to one embodiment, an architecture with a single Selective Repeat Automatic Repeat-reQuest (ARQ) layer in a Radio Link Protocol (RLC) is provided, where the RLC PDUs are transferred between a radio base station and mobile terminals over lower layers that implement transmission over multiple, differing, radio access technologies. On the receiving side, data packets or PDUs received on any of the aforementioned HARQ processes are then combined into a data stream forwarded to a single re-ordering entity, and further to a selective repeat ARQ instance.

Different embodiments are needed to facilitate the basic techniques summarized above. In particular, embodiments include both network and mobile terminal embodiments facilitating the simultaneous transmission and reception of data over at least two radio access technologies.

These techniques thus provide a novel architecture for aggregation of traffic transmitted over multiple access technologies. In some embodiments, this architecture will be "transparent" to higher layers of the protocol stack. Thus, higher layers, such as any layer above the protocol layer implementing the aforementioned selective repeat ARQ (for example, the IP layer), will be shielded from the particulars of the solution for using multiple access technologies simultaneously. The peak rates available to these higher layers will thus in many cases be the sum of the peak rates provided by each of the access technologies. In the example above, it would therefore be possible to provide the full benefit of the available 20 MHz to each user that benefit from the present invention.

Such embodiments are schematically illustrated by the earlier discussed FIG. 2.

The use of a single re-ordering entity typically results in a single data stream. In the network part, this data stream is typically forwarded from one of the RANs to the CN. Likewise, for DL data traffic, the CN provides a single data stream to one of the RANs. Thus, when performing RAT aggregation it may be beneficial to define a primary and one or more secondary RATs. The reason for this is that it is expected that the user plane and control plane configuration of the UE need to be coordinated between the RATs. The RAT handling the single data stream becomes a natural selection of a primary RAT.

In addition it is assumed that the inter-cell handover procedure also needs to be coordinated, i.e., it is not possible or beneficial to perform handover in each RAT independently. For this purpose it is assumed that the primary RAT controls the inter-cell mobility including the configuration of measurement reporting from the UE, receiving the measurement reports from the UE and triggering the inter-cell handover.

In the scope of the setting up the RAT aggregation, the primary RAT can be either the source RAT, i.e., the RAT of the source RAN, or the target RAT, i.e., the RAT of the target RAN. Correspondingly, the RAN utilizing the primary RAT is denoted the primary RAN and the RAN utilizing the secondary RAT is denoted the secondary RAN. In other words, in particular embodiments there is a further step of selecting one of the first radio access network and the second radio access network as a primary radio access network and the other one of the first radio access network and the second radio access network as a secondary radio access network. In order to allow for both of these cases the following mechanisms are used.

An indication is in one embodiment communicated from one RAT to the other RAT concerning which RAT is the primary RAT. In an alternative embodiment, the indication is "hard coded" in the RATs as to which RAT is the primary RAT. For instance, the predetermined hard coding may indicate that the primary RAT is always the source RAT, or always the target RAT, or always LTE, or always UTRAN.

In one particular embodiment, an indication is communicated from one of the RATs to the core network indicating if a change in the core network context should occur or not. A change of the core network context is expected in the case where the primary RAT is the target RAT, since prior to RAT resource aggregation, the connection would be handled through the source RAT which after the RAT aggregation will be the secondary RAT. By context is understood the settings in the CN defining the configuration of the used resources. In other words, if the primary RAN is the target radio access network, an embodiment of a method for managing RANs comprises indicating, from the primary radio access network or the secondary radio access network to a core network, that a change in a context of the core network should be performed.

In one particular embodiment, an indication is communicated to the UE which RAT is the primary RAT. In an alternative embodiment, this indication is "hard coded" in the UE defining which RAT is the primary RAT. For instance, the predetermined hard coding may indicate that the primary RAT is always the source RAT, or always the target RAT, or always LTE, or always UTRAN.

Figure 12:
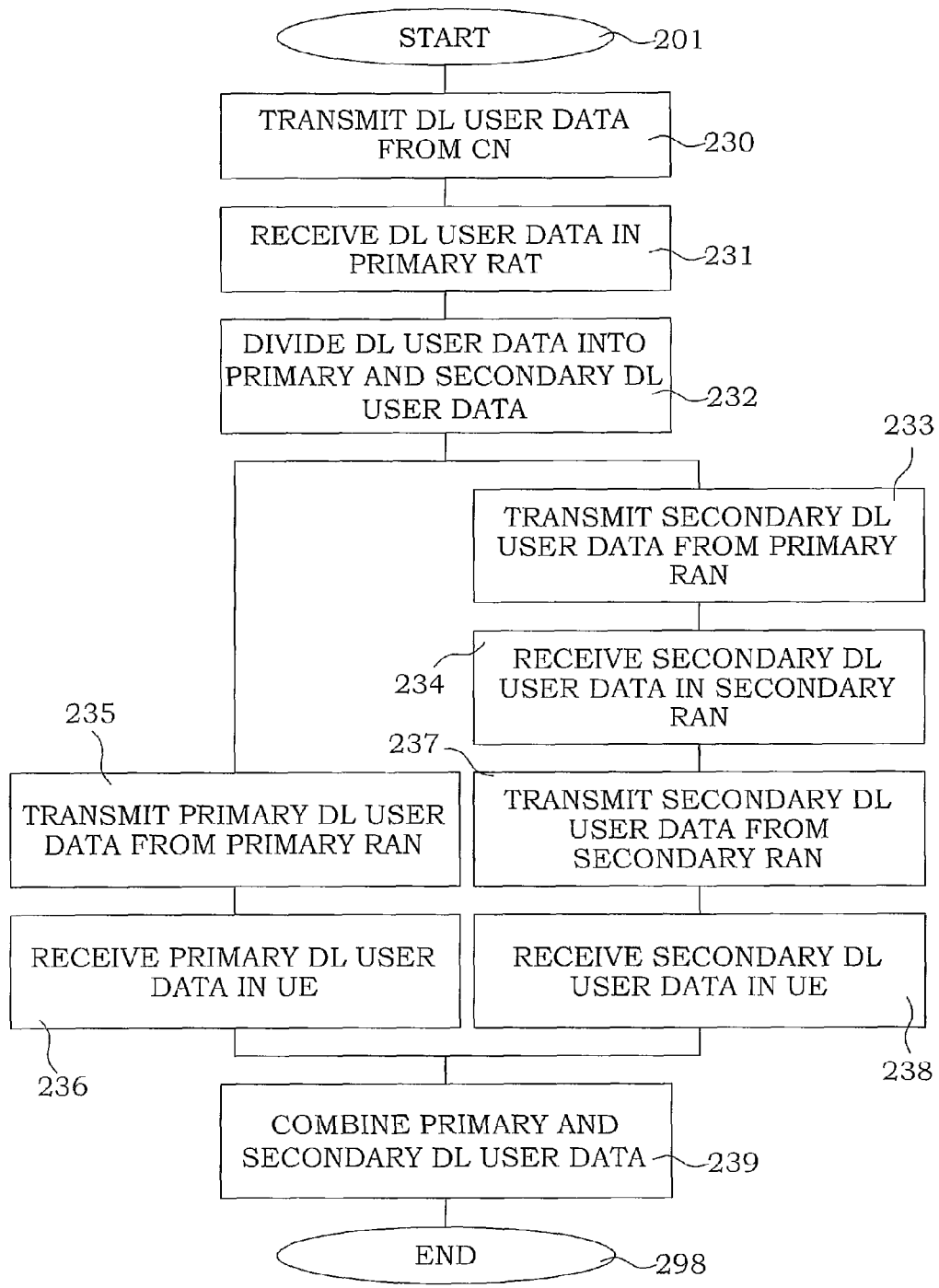
FIG. 12 is a flow diagram of steps of an embodiment of a method for managing DL user data.

By having defined a primary and a secondary RAN, an embodiment of a procedure of transferring DL user data within the radio access networks can be illustrated by FIG. 12. The procedure starts in step 201. In step 230, downlink user data is transmitted from a core network and in step 231 received in the primary RAN. In step 232, the downlink user data is divided into primary downlink user data and secondary downlink user data. This division takes place in the primary RAN. The secondary downlink user data is transmitted from the primary RAN in step 233 and is in step 234 received in the secondary RAN. The primary downlink user data is transmitted from the primary RAN in step 235 and received in the UE in step 236. In step 237, the secondary downlink user data is transmitted from the secondary RAN and received in the UE in step 238.

In the UE, the two received streams of DL user data are combined in step 239. Such procedure typically involves a common re-ordering of the packets of the two streams. The procedure ends in step 298.

Figure 13:
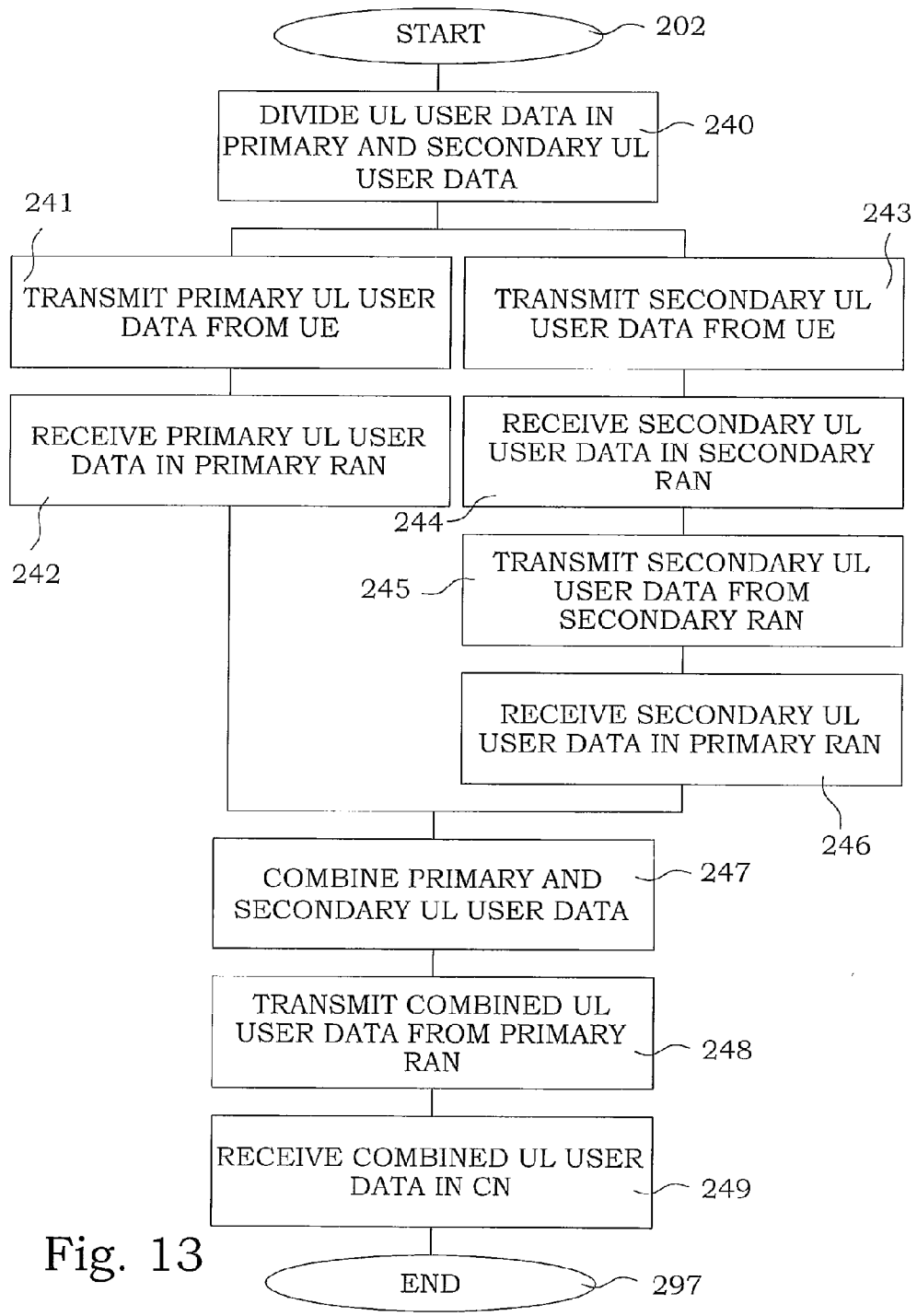
FIG. 13 is a flow diagram of steps of an embodiment of a method for managing UL user data.

For UL data streams, the UE divides an uplink user data stream into primary uplink user data and secondary uplink user data, which are transferred by two different RATs to the communication network. An embodiment of a procedure of transferring UL user data within the radio access networks can be illustrated by FIG. 13. The procedure starts in step 202. In step 240, the UE divides an uplink user data stream into primary uplink user data and secondary uplink user data. In step 241, primary uplink user data is transmitted from the UE and in step 242, the primary uplink user data is received in the primary RAN. In step 243 secondary uplink user data is transmitted from the UE, and in step 244, the secondary uplink user data is received in the secondary RAN. The secondary uplink user data is then, in step 245, transmitted from the secondary RAN. In step 246, the secondary uplink user data is received in the primary RAN. The primary uplink user data and the secondary uplink user data are combined in step 247 in the primary RAN into combined uplink user data. This typically involves a common re-ordering unit as described further above. In step 248, the combined uplink user data is transmitted from the primary RAN and is received in the CN in step 249. The procedure ends in step 297.

In a basic embodiment, the signaling necessary for establishing the RAT aggregation takes place between nodes of the two involved RANs and the UE. The nodes of the core network, e.g., the Mobility Management Entity (MME)/Serving General packet radio service Support Node (SGSN) or Packet data network/Serving Gateway (P/S-GW)/Gateway General packet radio service Support Node (GGSN), do at least not initially have to be involved. In other words, for RAT aggregation it should be possible to transmit the handover messages directly between the source and target radio node, thus bypassing the core network all together. In this case only that UE context related to the source RAT is used in the core network. The core network is not aware of the connection to the secondary RAT.

Figure 14:
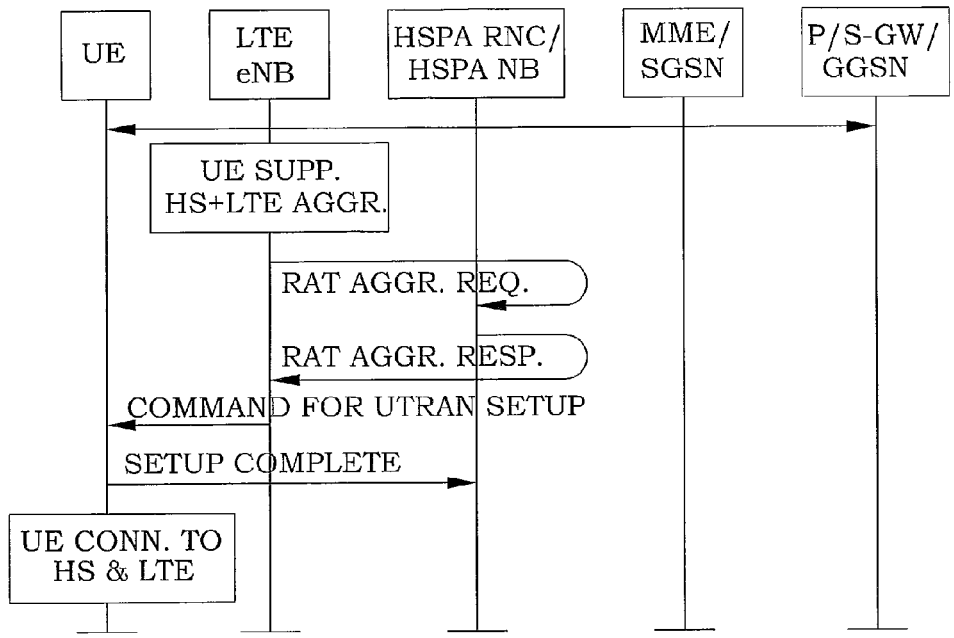
FIGS. 14-15 are signaling diagrams of an embodiment of a method for RAT aggregation initiation.

An embodiment of signaling for establishing a RAT aggregation is illustrated in FIG. 14, having LTE and HSPA as RATs. The UE supports both HSPA and LTE and is configured for allowing RAT aggregation. At least the LTE eNB is informed about this UE property. A radio access technology resource aggregation request is sent from the LTE eNB to the HSPA RNC/HSPA NB. A radio access technology resource aggregation request response is returned from the HSPA RNC/HSPA NB to the LTE eNB, preferably involving information concerning reserved radio resources of the HSPA. A command for UTRAN setup, i.e., a radio access technology resource aggregation command, is sent from the LTE eNB to the UE. Finally, the UE connects to the HSPA and the LTE simultaneously using RAT aggregation.

Figure 15:
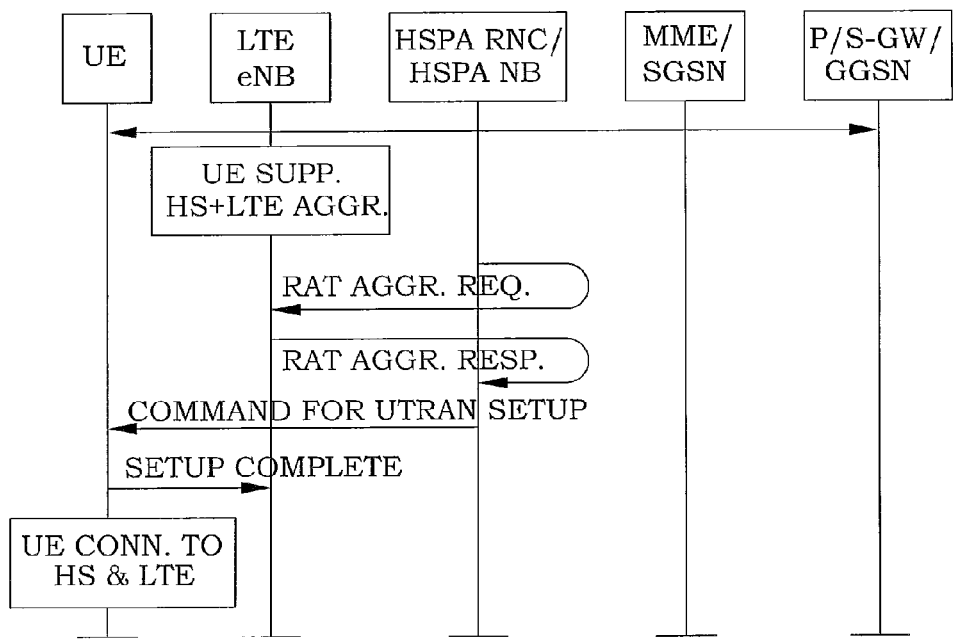

FIG. 15 illustrates a similar embodiment, however, now with the HSPA as source RAT. The UE supports also here both HSPA and LTE and is configured for allowing RAT aggregation. At least the HSPA RNC and/or HSPA NB is informed about this UE property. A radio access technology resource aggregation request is sent from the HSPA RNC/HSPA NB to the LTE eNB. A radio access technology resource aggregation request response is returned from the LTE eNB to the HSPA RNC/HSPA NB, preferably involving information concerning reserved radio resources of the LTE. A command for UTRAN setup, i.e., a radio access technology resource aggregation command, is sent from the HSPA RNC/HSPA NB to the UE. Finally, the UE connects to the HSPA and the LTE simultaneously using RAT aggregation.

In particular embodiments, the involved provide means to handle the signaling towards the core network nodes (e.g., MME, serving GW, PDN GW, SGSN). The following possible enhancements to the RAT aggregation procedure are possible, in combination with any of the techniques discussed above. Either the source or the target RAT could include an indication to the MME or SGSN, for example in conjunction with other handover signaling, to inform them that RAT aggregation is used. When the MME or SGSN receives this indication it can decide not to setup or move any core network configuration between the two RATs. In this case the MME and SGSN would just pass on the RAT signaling more or less transparently. Alternatively, when the MME or SGSN receives this indication they can decide to setup UE context in the core network for both RATs, i.e., create a UE context associated with the target RAT but not remove the UE context associated with the source RAT.

Still a further aspect of RAT aggregation is to provide a mechanism for handling RAT aggregation during inter-cell handover. In one embodiment above, it is assumed that the primary RAT is responsible for triggering inter-cell handover. It is also assumed that the primary RAT is using the existing inter-cell handover procedure in order to reserve resources in a target radio node. At inter-cell handover the following enhancements can be used to handle the existence of a secondary RAT.

The source radio node in the primary RAT provides an indication to the inter-cell target radio node in the primary RAT that the UE is using RAT aggregation. In addition, the inter-cell target radio node can be provided with configuration parameters indicating the identity of the secondary RAT radio node, which configuration the UE currently has, etc. The inter-cell target radio node can perform the handover for the primary RAT. In this case, once the UE has arrived in the target RAT the secondary RAT connection is setup using mechanism described earlier.

In other words, the primary radio access network initiates an inter-cell handover from a radio base station, to which the user equipment is connection, of the primary radio access network to another radio base station having the same radio access technology as the primary radio access network. The initiating of the inter-cell handover comprises information about that a radio access technology resource aggregation is used.

Alternatively, the inter-cell target radio node can trigger the setup of the secondary RAT prior to answering the source radio node in the primary RAT. Once the secondary RAT is prepared, the inter-cell target radio node can provide a handover command to the UE which includes the configuration of both RATs. In this case, the UE can receive handover information from both the primary and secondary RAT, allowing it to use both RATs immediately after the handover.

In other words, the initiation, by the primary radio access network, of an inter-cell handover further comprises initiation of an inter-cell handover from a radio base station, to which the user equipment is connection, of the secondary radio access network to another radio the station having the same radio access technology as the secondary radio access network.

Alternatively the inter-cell source radio node in the primary RAT can send a message to the secondary RAT in order to trigger the secondary RAT to also perform handover in parallel. In this case, the inter-cell source radio node will coordinate the handover so that the UE can immediately resume data transmission in both RATs after the handover.

In other words, the secondary radio access network initiates an inter-cell handover from a radio base station, to which the user equipment is connection, of the secondary radio access network to another radio base station having the same radio access technology as the secondary radio access network. The initiating of the inter-cell handover of secondary radio access technology connections comprises information about that a radio access technology resource aggregation is used. The inter-cell handover of the secondary radio access network is performed in parallel to the inter-cell handover of the primary radio access network.

In all the solutions above, it is possible to send an indication to the UE in the inter-cell handover command specifying whether the handover should apply to both RATs or only to the primary RAT. Alternatively the expected behavior can be "hard coded" in to the UE. In case the inter-cell handover should be considered only related to the primary RAT, the secondary RAT connection can either be kept as is, or implicitly or explicitly released.

Still a further aspect of RAT aggregation procedures is a mechanism for stopping the RAT aggregation, i.e., removing the connection to the secondary RAT. In a particular embodiment, the following mechanism can be considered for stopping RAT aggregation. Either the primary or secondary RAT transmits a release command to the UE indicating the removal of the connection to the secondary RAT. The command can be delivered in conjunction with other signaling, such as in conjunction with inter-cell handover, or as a separate message. The command can be delivered using the radio connection of either the primary or secondary RAT.

The secondary connection can also be implicitly released, for example when the primary connection is released, or at handover.

The UE will receive information related to the release of one of the RATs when performing RAT aggregation. The information can be received in a handover command or some other message.

In other words, an embodiment of a The method of the present invention comprises delivering of a release command from at least one of the first radio access network and the second radio access network to the user equipment, indicating a removal of the connection to the first radio base station or the second radio base station.

Using the techniques described above, high peak rates over multiple radio access technologies can be achieved. These techniques facilitate multi-RAT aggregation while shielding the aggregation from higher layers, meaning that higher layer protocols are un-aware of how the relevant packets are transmitted. Thus, the architecture and solutions can be implemented with a minimal impact on existing protocols in the relevant RATs. This facilitates a fast deployment of the solutions provided in the present invention.

Those skilled in the art will further appreciate that the various methods and processes described herein may be implemented using various hardware configurations, generally, but not necessarily including the use of one or more microprocessors, microcontrollers, digital signal processors, or the like, coupled to memory storing software instructions for carrying out the techniques described herein. As the design and cost tradeoffs for the various hardware approaches, which may depend on system-level requirements that are outside the scope of the present disclosure, are well known to those of ordinary skill in the art, further details of specific hardware implementations are not provided herein.

Various embodiments of the techniques and concepts include mobile terminals comprising processing circuits configured to carry out the signaling processes discussed above. Other embodiments include base stations, comprising processing circuits configured to receive and process the signaling transmitted by the mobile terminals.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

3GPP 3rd-Generation Partnership Project
3GPP2 3rd-Generation Partnership Project 2
ARQ Automatic Repeat-reQuest
CDMA Code-Division Multiple Access
CN Core network
DL Downlink
EDGE Enhanced Data for GSM Evolution
eNB Evolved Node-B
E-UTRAN Evolved Universal Terrestrial Radio Access Network
FDD Frequency Division Duplex
GGSN Gateway General packet radio service Support Node
GPRS General Packet Radio Service
GSM Global System for Mobile Communications
HARQ Hybrid Automatic Repeat-reQuest
HSPA High-Speed Packet Access
IEEE Institute of Electrical and Electronics Engineers
IFOM IP Flow Mobility and seamless WLAN offload
IP Internet Protocol
ITU International Telecommunications Union
LTE Long Term Evolution
MAC Medium Access Control
MME Mobility Management Entity
OFDM Orthogonal Frequency-Division Multiplexing
PDU Protocol Data Unit
P/S-GW Packet data network/Serving Gateway
RAN Radio Access Network
RAT Radio Access Technology
RBS Radio base station
RLC Radio Link Protocol
RNC Radio Network Controller
RRC Radio Resource Control
SC-FDMA Single-Carrier Frequency-Division Multiple Access
SGSN Serving General packet radio service Support Node
TCP Transmission Control Protocol
UE User Equipment
UL Uplink
UTRAN Universal Terrestrial Radio Access Network
WCDMA Wideband Code-Division Multiple Access
WiMAX Worldwide Interoperability for Microwave Access
WLAN Wireless Local Area Network

What is claimed is:

1. A method for managing radio access in a communication system, the method comprising:

sending, from a first radio access network to a second radio access network, a radio access technology resource aggregation request concerning communication with a user equipment connected to a source radio base station of a source radio access network, wherein said source radio access network is one of said first radio access network and said second radio access network, said first radio access network operates with a first radio access technology, and said second radio access network operates with a second radio access technology different from said first radio access technology;

receiving, in said first radio access network from said second radio access network, a radio access technology resource aggregation request response;

reserving radio resources of a target radio base station in a target radio access network, said target radio access network being the radio access network, of said first radio access network and said second radio access network, to which said user equipment is not connected, said source radio base station and said target radio base station having at least partly overlapping coverage areas;

sending, from said target radio access network to said source radio access network, a report of said reserved radio resources;

selecting one of said first radio access network and said second radio access network as a primary radio access network and the other one of said first radio access network and said second radio access network a secondary radio access network, wherein said primary radio access network is said target radio access network;

initiating, by said primary radio access network, an inter-cell handover from a radio base station, to which said user equipment is connected, of said primary radio access network to another radio base station having the same radio access technology as said primary radio access network, wherein said initiating of said inter-cell handover comprises information indicating that a radio access technology resource aggregation is used; and initiating, by said secondary radio access network, an inter-cell handover from a radio base station, to which said user equipment is connected, of said secondary radio access network to another radio base station having the same radio access technology as said secondary radio access network, wherein said initiating of said inter-cell handover comprises information indicating that a radio access technology resource aggregation is used and wherein said inter-cell handover of said secondary radio access network being performed in parallel to said inter-cell handover of said primary radio access network.

2. The method of claim 1, wherein said source radio access network is said first radio access network.

3. The method of claim 1, further comprising:

selecting one of said first radio access network and said second radio access network as a primary radio access network and the other one of said first radio access network and said second radio access network a secondary radio access network;

receiving combined downlink user data from a core network of said primary radio access network;

dividing said combined downlink user data in said primary radio access network into primary downlink user data and said secondary downlink user data;

transmitting said secondary downlink user data from said primary radio access network to said secondary radio access network; and transmitting said primary downlink user data from said primary radio access network to said user equipment.

4. The method of claim 1, further comprising:

selecting one of said first radio access network and said second radio access network as a primary radio access network and the other one of said first radio access network and said second radio access network a secondary radio access network;

receiving primary uplink user data in said primary radio access network from said user equipment;

receiving secondary uplink user data in said primary radio access network from said secondary radio access network;

combining said primary uplink user data and said secondary uplink user data in said primary radio access network into combined uplink user data; and transmitting said combined uplink user data from said primary radio access network to said core network.

5. The method of claim 1, further comprising:

selecting one of said first radio access network and said second radio access network as a primary radio access network and the other one of said first radio access network and said second radio access network a secondary radio access network, wherein said primary radio access network is said target radio access network; and indicating, from said primary radio access network or said secondary radio access network to a core network, that a change in a context of said core network should be performed.

6. The method of claim 1, further comprising delivering a release command from at least one of said first radio access network and said second radio access network to said user equipment, indicating a removal of the connection to at least one of said first radio base station and said second radio base station.

7. A method for managing radio access in a communication system, the method comprising:

sending, from a first radio access network to a second radio access network, a radio access technology resource aggregation request concerning communication with a user equipment connected to a source radio base station of a source radio access network, wherein said source radio access network is one of said first radio access network and said second radio access network, said first radio access network operates with a first radio access technology, and said second radio access network operates with a second radio access technology different from said first radio access technology;

receiving, in said first radio access network from said second radio access network, a radio access technology resource aggregation request response;

receiving, in said source radio access network from a target radio access network, a report of reserved radio resources in a target radio base station in the target radio access network, said target radio access network being the radio access network, of said first radio access network and said second radio access network, to which said user equipment is not connected and said source radio base station and said target radio base station having at least partly overlapping coverage areas;

transmitting, from said source radio access network to said user equipment, a radio access technology resource aggregation command, wherein said radio access technology resource aggregation command comprises information indicating that a radio access technology resource aggregation shall be used and information about said reserved radio resources;

selecting one of said first radio access network and said second radio access network as a primary radio access network and the other one of said first radio access network and said second radio access network a secondary radio access network, wherein said primary radio access network is said target radio access network;

initiating, by said primary radio access network, an inter-cell handover from a radio base station, to which said user equipment is connected, of said primary radio access network to another radio base station having the same radio access technology as said primary radio access network, wherein said initiating of said inter-cell handover comprises information indicating that a radio access technology resource aggregation is used; and initiating, by said secondary radio access network, an inter-cell handover from a radio base station, to which said user equipment is connected, of said secondary radio access network to another radio base station having the same radio access technology as said secondary radio access network, wherein said initiating of said inter-cell handover comprises information indicating that a radio access technology resource aggregation is used and wherein said inter-cell handover of said secondary radio access network being performed in parallel to said inter-cell handover of said primary radio access network.

8. The method of claim 7, further comprising:
selecting one of said first radio access network and said second radio access network as a primary radio access network and the other one of said first radio access network and said second radio access network a secondary radio access network;
receiving combined downlink user data from a core network of said primary radio access network;
dividing said combined downlink user data in said primary radio access network into primary downlink user data and said secondary downlink user data;
transmitting said secondary downlink user data from said primary radio access network to said secondary radio access network; and
transmitting said primary downlink user data from said primary radio access network to said user equipment.

9. The method of claim 7, further comprising:
selecting one of said first radio access network and said second radio access network as a primary radio access network and the other one of said first radio access network and said second radio access network a secondary radio access network;
receiving primary uplink user data in said primary radio access network from said user equipment;
receiving secondary uplink user data in said primary radio access network from said secondary radio access network;
combining said primary uplink user data and said secondary uplink user data in said primary radio access network into combined uplink user data; and
transmitting said combined uplink user data from said primary radio access network to said core network.

10. The method of claim 7, further comprising delivering a release command from at least one of said first radio access network and said second radio access network to said user equipment, indicating a removal of the connection to at least one of said first radio base station and said second radio base station.

11. A method for managing radio access in a communication system, the method comprising:
sending, from a first radio access network to a second radio access network, a radio access technology resource aggregation request concerning communication with a user equipment connected to a source radio base station of a source radio access network, wherein said source radio access network is one of said first radio access network and said second radio access network, said first radio access network operates with a first radio access technology, and said second radio access network operates with a second radio access technology different from said first radio access technology;
receiving, in said first radio access network from said second radio access network, a radio access technology resource aggregation request response;
receiving, in said source radio access network from a target radio access network, a report of reserved radio resources in a target radio base station in the target radio access network, said target radio access network being the radio access network, of said first radio access network and said second radio access network, to which said user equipment is not connected and said source radio base station and said target radio base station having at least partly overlapping coverage areas;
transmitting, from said source radio access network to said user equipment, a radio access technology resource aggregation command, wherein said radio access technology resource aggregation command comprises information indicating that a radio access technology resource aggregation shall be used and information about said reserved radio resources;
selecting one of said first radio access network and said second radio access network as a primary radio access network and the other one of said first radio access network and said second radio access network a secondary radio access network, wherein said primary radio access network is said target radio access network;
initiating, by said primary radio access network, an inter-cell handover from a radio base station, to which said user equipment is connected, of said primary radio access network to another radio base station having the same radio access technology as said primary radio access network, wherein said initiating of said inter-cell handover comprises information indicating that a radio access technology resource aggregation is used; and
wherein said initiating, by said primary radio access network, of an inter-cell handover further comprises initiation of an inter-cell handover from a radio base station, to which said user equipment is connected, of said secondary radio access network to another radio base station having the same radio access technology as said secondary radio access network.

12. The method of claim 11, further comprising:
selecting one of said first radio access network and said second radio access network as a primary radio access network and the other one of said first radio access network and said second radio access network a secondary radio access network;
receiving combined downlink user data from a core network of said primary radio access network;
dividing said combined downlink user data in said primary radio access network into primary downlink user data and said secondary downlink user data;
transmitting said secondary downlink user data from said primary radio access network to said secondary radio access network; and transmitting said primary downlink user data from said primary radio access network to said user equipment.

13. The method of claim 11, further comprising:
selecting one of said first radio access network and said second radio access network as a primary radio access network and the other one of said first radio access network and said second radio access network a secondary radio access network;
receiving primary uplink user data in said primary radio access network from said user equipment;
receiving secondary uplink user data in said primary radio access network from said secondary radio access network;
combining said primary uplink user data and said secondary uplink user data in said primary radio access network into combined uplink user data; and
transmitting said combined uplink user data from said primary radio access network to said core network.

14. The method of claim 11, further comprising delivering a release command from at least one of said first radio access network and said second radio access network to said user equipment, indicating a removal of the connection to at least one of said first radio base station and said second radio base station.

15. A method for managing radio access in a communication system, the method comprising:
sending, from a first radio access network to a second radio access network, a radio access technology resource aggregation request concerning communication with a user equipment connected to a source radio base station of a source radio access network, wherein said source radio access network is one of said first radio access network and said second radio access network, said first radio access network operates with a first radio access technology, and said second radio access network operates with a second radio access technology different from said first radio access technology;
receiving, in said first radio access network from said second radio access network, a radio access technology resource aggregation request response;
reserving radio resources of a target radio base station in a target radio access network, said target radio access network being the radio access network, of said first radio access network and said second radio access network, to which said user equipment is not connected, said source radio base station and said target radio base station having at least partly overlapping coverage areas;
sending, from said target radio access network to said source radio access network, a report of said reserved radio resources;
selecting one of said first radio access network and said second radio access network as a primary radio access network and the other one of said first radio access network and said second radio access network a secondary radio access network, wherein said primary radio access network is said target radio access network;
initiating, by said primary radio access network, an inter-cell handover from a radio base station, to which said user equipment is connected, of said primary radio access network to another radio base station having the same radio access technology as said primary radio access network, wherein said initiating of said inter-cell handover comprises information indicating that a radio access technology resource aggregation is used; and
wherein said initiating, by said primary radio access network, of an inter-cell handover further comprises initiation of an inter-cell handover from a radio base station, to which said user equipment is connected, of said secondary radio access network to another radio base station having the same radio access technology as said secondary radio access network.

16. The method of claim 15, further comprising:
selecting one of said first radio access network and said second radio access network as a primary radio access network and the other one of said first radio access network and said second radio access network a secondary radio access network;
receiving combined downlink user data from a core network of said primary radio access network;
dividing said combined downlink user data in said primary radio access network into primary downlink user data and said secondary downlink user data;
transmitting said secondary downlink user data from said primary radio access network to said secondary radio access network; and
transmitting said primary downlink user data from said primary radio access network to said user equipment.

17. The method of claim 15, further comprising:
selecting one of said first radio access network and said second radio access network as a primary radio access network and the other one of said first radio access network and said second radio access network a secondary radio access network;
receiving primary uplink user data in said primary radio access network from said user equipment;
receiving secondary uplink user data in said primary radio access network from said secondary radio access network;
combining said primary uplink user data and said secondary uplink user data in said primary radio access network into combined uplink user data; and
transmitting said combined uplink user data from said primary radio access network to said core network.

18. The method of claim 15, further comprising delivering a release command from at least one of said first radio access network and said second radio access network to said user equipment, indicating a removal of the connection to at least one of said first radio base station and said second radio base station.

19. A method for establishing a radio access technology resource aggregation in a communication system, the method comprising:
receiving, in a user equipment, a radio access technology resource aggregation command from a source radio base station of a source radio access network;
said radio access technology resource aggregation command comprising information indicating that a radio access technology resource aggregation shall be used and information about reserved radio resources of a target radio base station of a target radio access network, wherein said source radio access network operates with a first radio access technology, said target radio access network operates with a second radio access technology different from said first radio access technology, and wherein said source radio base station and said target radio base station have at least partly overlapping coverage areas;
transmitting user equipment radio access capability information from said user equipment to said communication system identifying said user equipment as being able to support radio access technology resource aggregation; and setting up, among said user equipment, said target radio base station, and said source base station, a radio access technology resource aggregation according to said reserved radio resources.

20. A node of a first radio access network for use in a communication system, comprising:
   a first transceiver configured to communicate with at least a second radio access network and further configured to either (a) send a radio access technology resource aggregation request to said second radio access network concerning communication with a user equipment connected to a radio base station of a source radio access network, and receive a radio access technology resource aggregation request response from said second radio access network, or (b) receive a radio access technology resource aggregation request from said second radio access network concerning communication with a user equipment connected to a radio base station of a source radio access network and transmit a radio access technology resource aggregation request response to said second radio access network, or both, wherein said source radio access network is one of said first radio access network and said second radio access network, said first radio access network operates with a first radio access technology, and said second radio access network operates with a second radio access technology different from said first radio access technology; and
   a resource manager configured to reserve radio resources of a target radio base station of said first radio access network, wherein said source radio base station and said target radio base station have at least partly overlapping coverage areas;
   wherein said first transceiver is further configured to report said reserved radio resources from said first radio access network to said second radio access network; and
   a second transceiver configured for communication with said user equipment and further configured to receive user equipment radio access capability information from said user equipment identifying said user equipment as being able to support radio access technology resource aggregation.

21. A node of a first radio access network for use in a communication system, comprising:
   a first transceiver configured to communicate with at least a second radio access network and further configured to either (a) send a radio access technology resource aggregation request to said second radio access network concerning communication with a user equipment connected to a radio base station of a source radio access network, and receive a radio access technology resource aggregation request response from said second radio access network, or (b) receive a radio access technology resource aggregation request from said second radio access network concerning communication with a user equipment connected to a radio base station of a source radio access network and transmit a radio access technology resource aggregation request response to said second radio access network, or both, wherein said source radio access network is one of said first radio access network and said second radio access network, said first radio access network operates with a first radio access technology, and said second radio access network operates with a second radio access technology different from said first radio access technology;
   wherein said first transceiver is further configured to receive, from said second radio access network, a report of reserved radio resources of a target radio base station of said second radio access network, wherein said source radio base station and said target radio base station have at least partly overlapping coverage areas; and
   a second transceiver configured for communication with at least said user equipment and further configured to:
      transmit a radio access technology resource aggregation command to said user equipment, wherein said radio access technology resource aggregation command comprises information indicating that a radio access technology resource aggregation shall be used and information about reserved radio resources of said target radio base station; and
      receive user equipment radio access capability information from said user equipment identifying said user equipment as being able to support radio access technology resource aggregation.

22. User equipment for use in a communication system, comprising:
   a transceiver configured to communicate with a source radio base station of a source radio access network of said communication system and a target radio base station of a target radio access network of said communication system, wherein said source radio access network operates with a first radio access technology, said target radio access network operates with a second radio access technology different from said first radio access technology, and said source radio base station and said target radio base station have at least partly overlapping coverage areas;
   said transceiver being further configured to:
      receive a radio access technology resource aggregation command from said source radio base station, said radio access technology resource aggregation command comprising information indicating that a radio access technology resource aggregation shall be used and information about reserved radio resources of said target radio base station; and
      transmit user equipment radio access capability information to the communication system identifying said user equipment as being able to support radio access technology resource aggregation; and
   a connection handler, configured to configure said user equipment for setting up a radio access technology resource aggregation to said target radio base station and said source base station, according to said reserved radio resources.

* * * * *